United States Patent
Hsu et al.

(10) Patent No.: US 10,429,620 B2
(45) Date of Patent: Oct. 1, 2019

(54) OPTICAL IMAGING LENS

(71) Applicant: GENIUS ELECTRONIC OPTICAL (XIAMEN) CO., LTD., Xiamen (CN)

(72) Inventors: Sheng-Wei Hsu, Taichung (TW); Pei-Chi Wang, Taichung (TW)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 12 days.

(21) Appl. No.: 15/791,889

(22) Filed: Oct. 24, 2017

(65) Prior Publication Data
US 2019/0064482 A1    Feb. 28, 2019

(30) Foreign Application Priority Data
Aug. 23, 2017    (CN) .......................... 2017 1 0728733

(51) Int. Cl.
*G02B 13/00*    (2006.01)
*G02B 27/00*    (2006.01)
*G02B 9/60*    (2006.01)

(52) U.S. Cl.
CPC .......... *G02B 13/0045* (2013.01); *G02B 9/60* (2013.01); *G02B 27/0025* (2013.01); *G02B 27/0075* (2013.01)

(58) Field of Classification Search
CPC ....... G02B 9/60; G02B 13/0035; G02B 13/04
See application file for complete search history.

(56) References Cited

U.S. PATENT DOCUMENTS

2017/0168264 A1*    6/2017    Chen .................... G02B 9/60
2017/0205604 A1*    7/2017    Hsu .................... G02B 13/0045

* cited by examiner

*Primary Examiner* — Darryl J Collins
*Assistant Examiner* — Journey F Sumlar
(74) *Attorney, Agent, or Firm* — Baker & McKenzie LLP

(57) ABSTRACT

The present disclosure provides for various embodiments of optical imaging lenses. An optical imaging lens may comprise at least five lens elements positioned in an order from an object side to an image side. By controlling the convex or concave shape of the surfaces of the lens elements and designing parameters satisfying at least an inequality, the optical imaging lens may exhibit better optical characteristics, the total length of the optical imaging lens may be shortened, and the view angle and f-number may also be improved.

19 Claims, 33 Drawing Sheets

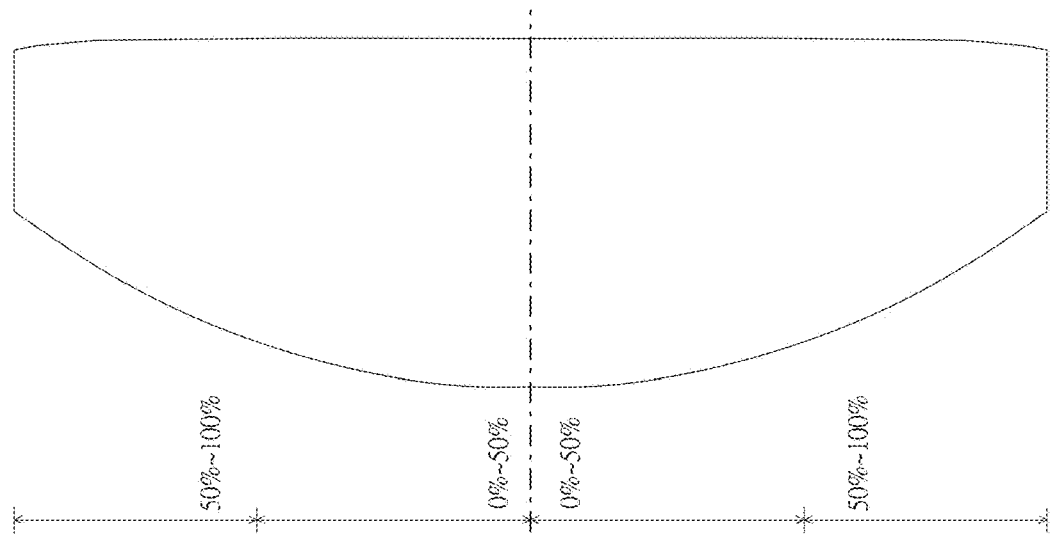
FIG. 5
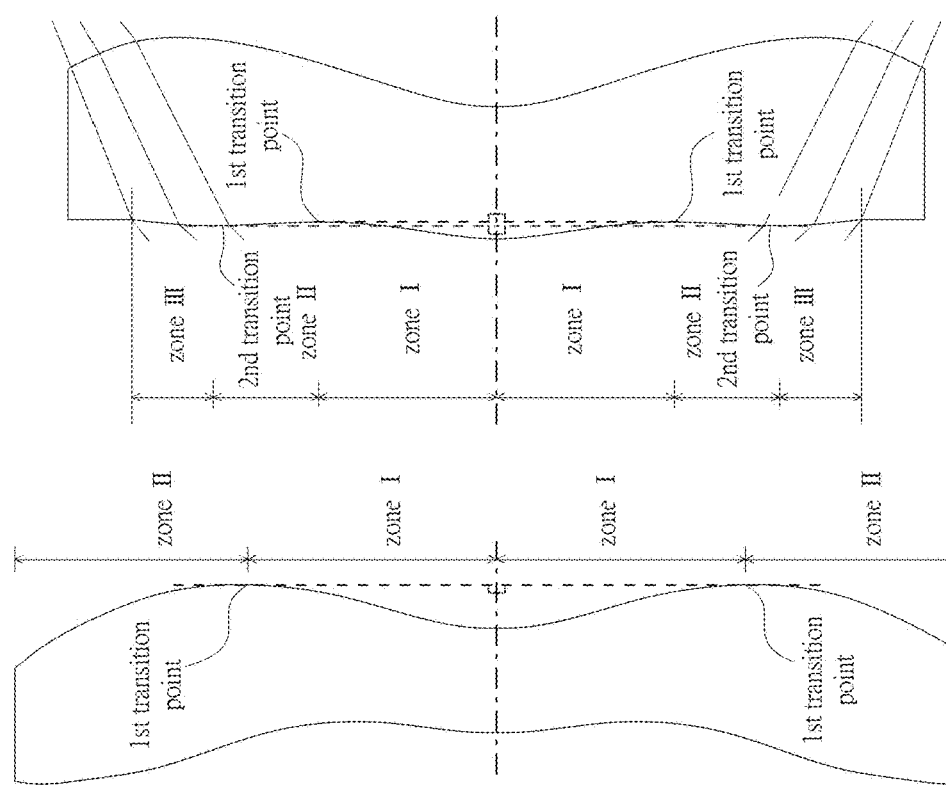
FIG. 4
FIG. 3

Effective focal length (EFL) = 1.454 mm, HFOV (Half field of view) = 55.000 deg., TTL = 6.243 mm, Image height= 1.744 mm, Fno = 2.20

| Surface # | | Radius (mm) | Thickness / air gap (mm) | Refractive index | Abbe number | Focal length (mm) | Material |
|---|---|---|---|---|---|---|---|
| - | Object | INFINITY | 1000.000 | | | | |
| 111 | 1st lens element | 2.722 | 0.500(T1) | 1.535(n1) | 56.273(V1) | -2.193(f1) | Plastic |
| 112 | | 0.768 | 1.519(G12-TA) | | | | |
| 100 | Aperture stop | INFINITY | -0.020(TA) | | | | |
| 121 | 2nd lens element | 2.559 | 0.639(T2) | 1.535(n2) | 56.273(V2) | 2.094(f2) | Plastic |
| 122 | | -1.822 | 0.058(G23) | | | | |
| 131 | 3rd lens element | 2.530 | 0.434(T3) | 1.663(n3) | 20.401(V3) | -3.841(f3) | Plastic |
| 132 | | 1.182 | 0.087(G34) | | | | |
| 141 | 4th lens element | 1.631 | 1.396(T4) | 1.535(n4) | 56.273(V4) | 1.592(f4) | Plastic |
| 142 | | -1.253 | 0.050(G45) | | | | |
| 151 | 5th lens element | 8.132 | 0.481(T5) | 1.644(n5) | 22.409(V5) | -2.947(f5) | Plastic |
| 152 | | 1.504 | 0.200(G5F) | | | | |
| 161 | IR cut filter | INFINITY | 0.300(TF) | | | | |
| 162 | | INFINITY | 0.600(GFP) | | | | |
| 170 | Image plane | INFINITY | 0.000 | | | | |

FIG. 8

| | Aspherical parameters | | | | |
|---|---|---|---|---|---|
| Surface # | 111 | 112 | 121 | 122 | 131 |
| K | 0.000000E+00 | -1.269240E+00 | 0.000000E+00 | 0.000000E+00 | 0.000000E+00 |
| $a_4$ | 8.138222E-02 | 4.652672E-01 | 2.673562E-03 | -6.151163E-03 | -2.119422E-01 |
| $a_6$ | -7.297248E-02 | -9.460543E-02 | -3.228956E-02 | -1.116727E-01 | 2.604281E-01 |
| $a_8$ | 1.772500E-02 | -9.663070E-03 | -1.621185E-01 | 6.462560E-01 | -2.251469E-01 |
| $a_{10}$ | -1.611006E-03 | -8.809974E-02 | 0.000000E+00 | -2.171495E+00 | -5.001815E-01 |
| $a_{12}$ | 0.000000E+00 | 4.467841E-02 | 0.000000E+00 | 1.853016E+00 | 6.272256E-01 |
| $a_{14}$ | 0.000000E+00 | 0.000000E+00 | 0.000000E+00 | 0.000000E+00 | 0.000000E+00 |
| Surface # | 132 | 141 | 142 | 151 | 152 |
| K | 0.000000E+00 | 0.000000E+00 | 0.000000E+00 | 0.000000E+00 | 0.000000E+00 |
| $a_4$ | -4.205730E-01 | -1.397934E-01 | 2.377166E-02 | -4.819825E-01 | -4.320010E-01 |
| $a_6$ | 4.052375E-01 | 4.844741E-02 | 3.455838E-01 | 4.395916E-01 | 3.046692E-01 |
| $a_8$ | -3.906920E-01 | 6.941979E-02 | -4.588312E-01 | -5.044579E-01 | -2.046394E-01 |
| $a_{10}$ | 0.000000E+00 | -4.836227E-02 | 2.481013E-01 | 2.457653E-01 | 8.551536E-02 |
| $a_{12}$ | 0.000000E+00 | 0.000000E+00 | 0.000000E+00 | 5.288644E-02 | -1.612276E-02 |
| $a_{14}$ | 0.000000E+00 | 0.000000E+00 | 0.000000E+00 | -4.164342E-02 | 0.000000E+00 |

FIG. 9

| Effective focal length (EFL) = 1.330 mm, HFOV (Half field of view) = 55.000 deg., TTL = 5.576 mm, Image height= 1.744 mm, Fno = 2.20 ||||||| 
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 211 | 1st lens element | 2.470 | 0.378(T1) | 1.535(n1) | 56.273(V1) | -2.096(f1) | Plastic |
| 212 | | 0.730 | 1.512(G12-TA) | | | | |
| 200 | Aperture stop | INFINITY | -0.016(TA) | | | | |
| 221 | 2nd lens element | 2.028 | 0.513(T2) | 1.535(n2) | 56.273(V2) | 1.903(f2) | Plastic |
| 222 | | -1.867 | 0.168(G23) | | | | |
| 231 | 3rd lens element | 3.119 | 0.340(T3) | 1.663(n3) | 20.401(V3) | -3.060(f3) | Plastic |
| 232 | | 1.176 | 0.095(G34) | | | | |
| 241 | 4th lens element | 1.609 | 0.736(T4) | 1.535(n4) | 56.273(V4) | 1.539(f4) | Plastic |
| 242 | | -1.419 | 0.050(G45) | | | | |
| 251 | 5th lens element | 6.575 | 0.665(T5) | 1.644(n5) | 22.409(V5) | -4.038(f5) | Plastic |
| 252 | | 1.790 | 0.236(G5F) | | | | |
| 261 | IR cut filter | INFINITY | 0.300(TF) | | | | |
| 262 | | INFINITY | 0.600(GFP) | | | | |
| 270 | Image plane | INFINITY | 0.000 | | | | |

FIG. 12

| Aspherical parameters | | | | | |
|---|---|---|---|---|---|
| Surface # | 211 | 212 | 221 | 222 | 231 |
| K | 0.000000E+00 | -1.269240E+00 | 0.000000E+00 | 0.000000E+00 | 0.000000E+00 |
| $a_4$ | 8.990597E-02 | 5.182231E-01 | -5.439597E-02 | -2.097165E-02 | -2.684357E-01 |
| $a_6$ | -7.186218E-02 | 1.140992E-01 | -3.473467E-02 | -1.991957E-01 | 4.652956E-01 |
| $a_8$ | 1.769173E-02 | -2.317756E-02 | -4.345827E-01 | 5.488278E-01 | -6.802471E-01 |
| $a_{10}$ | -1.723337E-03 | 1.877322E-02 | 0.000000E+00 | -2.233250E+00 | 1.288423E-01 |
| $a_{12}$ | 0.000000E+00 | 4.467841E-02 | 0.000000E+00 | 1.853016E+00 | 3.548292E-01 |
| $a_{14}$ | 0.000000E+00 | 0.000000E+00 | 0.000000E+00 | 0.000000E+00 | 0.000000E+00 |
| Surface # | 232 | 241 | 242 | 251 | 252 |
| K | 0.000000E+00 | 0.000000E+00 | 0.000000E+00 | 0.000000E+00 | 0.000000E+00 |
| $a_4$ | -5.264856E-01 | -1.288473E-01 | 1.820360E-02 | -4.075918E-01 | -3.302902E-01 |
| $a_6$ | 6.549296E-01 | 4.631759E-02 | 3.506827E-01 | 4.487148E-01 | 2.984942E-01 |
| $a_8$ | -7.069502E-01 | 5.376067E-02 | -4.481423E-01 | -4.974667E-01 | -2.036054E-01 |
| $a_{10}$ | 0.000000E+00 | -6.776907E-02 | 2.775260E-01 | 2.375658E-01 | 8.705819E-02 |
| $a_{12}$ | 0.000000E+00 | 0.000000E+00 | 0.000000E+00 | 5.288644E-02 | -1.640661E-02 |
| $a_{14}$ | 0.000000E+00 | 0.000000E+00 | 0.000000E+00 | -4.164342E-02 | 0.000000E+00 |

FIG. 13

| Effective focal length (EFL) = 1.800 mm, HFOV (Half field of view) = 54.943 deg., TTL = 4.588 mm, Image height= 1.744 mm, Fno = 2.20 ||||||| 
|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 311 | 1st lens element | 2.734 | 0.300(T1) | 1.535(n1) | 56.273(V1) | -3.026(f1) | Plastic |
| 312 | | 0.978 | 1.056(G12-TA) | | | | |
| 300 | Aperture stop | INFINITY | -0.066(TA) | | | | |
| 321 | 2nd lens element | 1.765 | 0.490(T2) | 1.535(n2) | 56.273(V2) | 2.189(f2) | Plastic |
| 322 | | -3.151 | 0.050(G23) | | | | |
| 331 | 3rd lens element | 1.783 | 0.300(T3) | 1.663(n3) | 20.401(V3) | -8.819(f3) | Plastic |
| 332 | | 1.275 | 0.167(G34) | | | | |
| 341 | 4th lens element | 2.061 | 0.640(T4) | 1.535(n4) | 56.273(V4) | 1.672(f4) | Plastic |
| 342 | | -1.411 | 0.251(G45) | | | | |
| 351 | 5th lens element | 69.065 | 0.300(T5) | 1.644(n5) | 22.409(V5) | -2.411(f5) | Plastic |
| 352 | | 1.517 | 0.200(G5F) | | | | |
| 361 | IR cut filter | INFINITY | 0.300(TF) | | | | |
| 362 | | INFINITY | 0.600(GFP) | | | | |
| 370 | Image plane | INFINITY | 0.000 | | | | |

FIG. 16

| Aspherical parameters | | | | | |
|---|---|---|---|---|---|
| Surface # | 311 | 312 | 321 | 322 | 331 |
| K | 0.000000E+00 | -1.269240E+00 | 0.000000E+00 | 0.000000E+00 | 0.000000E+00 |
| $a_4$ | 4.215202E-02 | 2.964142E-01 | 7.131303E-02 | 5.096285E-02 | -1.773704E-01 |
| $a_6$ | -6.916760E-02 | 1.287756E-01 | -7.204574E-02 | -1.328093E-01 | 3.164707E-01 |
| $a_8$ | 3.061923E-02 | -2.170142E-01 | 4.736651E-02 | 6.100393E-01 | -5.074222E-01 |
| $a_{10}$ | -5.247315E-03 | 5.050444E-01 | 0.000000E+00 | -1.934778E+00 | 2.846462E-02 |
| $a_{12}$ | 0.000000E+00 | 4.467841E-02 | 0.000000E+00 | 1.853016E+00 | 2.186212E-01 |
| $a_{14}$ | 0.000000E+00 | 0.000000E+00 | 0.000000E+00 | 0.000000E+00 | 0.000000E+00 |
| Surface # | 332 | 341 | 342 | 351 | 352 |
| K | 0.000000E+00 | 0.000000E+00 | 0.000000E+00 | 0.000000E+00 | 0.000000E+00 |
| $a_4$ | -3.753503E-01 | -7.226588E-02 | 1.752543E-01 | -5.407354E-01 | -6.055970E-01 |
| $a_6$ | 5.668541E-01 | -7.057778E-02 | 3.555308E-02 | 1.585778E-01 | 3.978552E-01 |
| $a_8$ | -7.752737E-01 | 9.709720E-02 | -3.854976E-01 | -2.740834E-01 | -2.279616E-01 |
| $a_{10}$ | 0.000000E+00 | -3.282850E-02 | 4.492677E-01 | 2.777197E-01 | 8.598198E-02 |
| $a_{12}$ | 0.000000E+00 | 0.000000E+00 | 0.000000E+00 | 5.288644E-02 | -1.569140E-02 |
| $a_{14}$ | 0.000000E+00 | 0.000000E+00 | 0.000000E+00 | -4.164342E-02 | 0.000000E+00 |

FIG. 17

| Effective focal length (EFL) = 0.888 mm, HFOV (Half field of view) = 55.000 deg., TTL = 5.723 mm, Image height= 1.744 mm, Fno = 2.20 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 411 | 1st lens element | 2.179 | 1.038(T1) | 1.535(n1) | 56.273(V1) | -1.821(f1) | Plastic |
| 412 | | 0.562 | 1.551(G12-TA) | | | | |
| 400 | Aperture stop | INFINITY | 0.005(TA) | | | | |
| 421 | 2nd lens element | 1.978 | 0.365(T2) | 1.535(n2) | 56.273(V2) | 2.651(f2) | Plastic |
| 422 | | -4.701 | 0.050(G23) | | | | |
| 431 | 3rd lens element | 2.160 | 0.300(T3) | 1.663(n3) | 20.401(V3) | -5.439(f3) | Plastic |
| 432 | | 1.276 | 0.069(G34) | | | | |
| 441 | 4th lens element | 1.374 | 0.894(T4) | 1.535(n4) | 56.273(V4) | 1.338(f4) | Plastic |
| 442 | | -1.157 | 0.050(G45) | | | | |
| 451 | 5th lens element | 14.714 | 0.300(T5) | 1.644(n5) | 22.409(V5) | 17.299(f5) | Plastic |
| 452 | | -45.630 | 0.200(G5F) | | | | |
| 461 | IR cut filter | INFINITY | 0.300(TF) | | | | |
| 462 | | INFINITY | 0.600(GFP) | | | | |
| 470 | Image plane | INFINITY | 0.000 | | | | |

FIG. 20

| Aspherical parameters | | | | | |
|---|---|---|---|---|---|
| Surface # | 411 | 412 | 421 | 422 | 431 |
| K | 0.000000E+00 | -1.269240E+00 | 0.000000E+00 | 0.000000E+00 | 0.000000E+00 |
| $a_4$ | 1.713225E-01 | 1.656812E+00 | -1.302430E-02 | -7.624928E-02 | -4.099237E-01 |
| $a_6$ | -7.256984E-02 | -5.772277E-01 | 4.322447E-01 | -2.110772E-01 | 1.601936E+00 |
| $a_8$ | 1.645475E-02 | -1.587760E+00 | -2.225299E-01 | 9.302640E+00 | -2.880847E+00 |
| $a_{10}$ | -2.037726E-03 | 4.021454E+00 | 0.000000E+00 | -3.393189E+01 | 1.890604E+00 |
| $a_{12}$ | 0.000000E+00 | 4.467841E-02 | 0.000000E+00 | 4.401551E+01 | 1.946383E-01 |
| $a_{14}$ | 0.000000E+00 | 0.000000E+00 | 0.000000E+00 | 0.000000E+00 | 0.000000E+00 |
| Surface # | 432 | 441 | 442 | 451 | 452 |
| K | 0.000000E+00 | 0.000000E+00 | 0.000000E+00 | 0.000000E+00 | 0.000000E+00 |
| $a_4$ | -5.192897E-01 | -2.042875E-01 | -6.609817E-02 | -4.655883E-01 | 2.217610E-01 |
| $a_6$ | 9.682458E-01 | 2.549273E-01 | 6.344170E-01 | 9.831534E-01 | -1.266809E+00 |
| $a_8$ | -1.227770E+00 | -2.038551E-01 | -9.185624E-01 | -5.184934E+00 | 1.962575E+00 |
| $a_{10}$ | 0.000000E+00 | 5.216850E-02 | 4.960351E-01 | 1.158358E+01 | -1.231328E+00 |
| $a_{12}$ | 0.000000E+00 | 0.000000E+00 | 0.000000E+00 | -1.221488E+01 | 2.768340E-01 |
| $a_{14}$ | 0.000000E+00 | 0.000000E+00 | 0.000000E+00 | 4.717889E+00 | 0.000000E+00 |

FIG. 21

| Effective focal length (EFL) = 0.880 mm, HFOV (Half field of view) = 59.299 deg., TTL = 5.964 mm, Image height= 1.744 mm, Fno = 2.20 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 511 | 1st lens element | 2.208 | 0.435(T1) | 1.535(n1) | 56.273(V1) | -1.766(f1) | Plastic |
| 512 | | 0.617 | 1.912(G12-TA) | | | | |
| 500 | Aperture stop | INFINITY | 0.003(TA) | | | | |
| 521 | 2nd lens element | 2.267 | 0.437(T2) | 1.535(n2) | 56.273(V2) | 1.973(f2) | Plastic |
| 522 | | -1.846 | 0.347(G23) | | | | |
| 531 | 3rd lens element | 3.550 | 0.359(T3) | 1.663(n3) | 20.401(V3) | -3.016(f3) | Plastic |
| 532 | | 1.228 | 0.087(G34) | | | | |
| 541 | 4th lens element | 1.666 | 0.936(T4) | 1.535(n4) | 56.273(V4) | 1.457(f4) | Plastic |
| 542 | | -1.179 | 0.050(G45) | | | | |
| 551 | 5th lens element | 15.110 | 0.300(T5) | 1.644(n5) | 22.409(V5) | 103.070(f5) | Plastic |
| 552 | | 19.407 | 0.200(G5F) | | | | |
| 561 | IR cut filter | INFINITY | 0.300(TF) | | | | |
| 562 | | INFINITY | 0.600(GFP) | | | | |
| 570 | Image plane | INFINITY | 0.000 | | | | |

FIG. 24

| Aspherical parameters | | | | | |
|---|---|---|---|---|---|
| Surface # | 511 | 512 | 521 | 522 | 531 |
| K | 0.000000E+00 | -1.269240E+00 | 0.000000E+00 | 0.000000E+00 | 0.000000E+00 |
| $a_4$ | 8.900521E-02 | 5.807716E-01 | -3.338509E-02 | 4.526573E-02 | -2.426236E-01 |
| $a_6$ | -7.421201E-02 | -2.377162E-02 | 5.500582E-02 | -7.564777E-02 | 4.031449E-01 |
| $a_8$ | 1.723050E-02 | -1.497118E-01 | 5.612407E-03 | 5.807102E-01 | -4.365448E-01 |
| $a_{10}$ | -1.684592E-03 | -1.604983E-02 | 0.000000E+00 | -1.333110E+00 | 2.055434E-01 |
| $a_{12}$ | 0.000000E+00 | 4.467841E-02 | 0.000000E+00 | 1.853016E+00 | 1.583879E-02 |
| $a_{14}$ | 0.000000E+00 | 0.000000E+00 | 0.000000E+00 | 0.000000E+00 | 0.000000E+00 |
| Surface # | 532 | 541 | 542 | 551 | 552 |
| K | 0.000000E+00 | 0.000000E+00 | 0.000000E+00 | 0.000000E+00 | 0.000000E+00 |
| $a_4$ | -4.807066E-01 | -1.403656E-01 | 1.310737E-02 | -4.493934E-01 | -2.172789E-01 |
| $a_6$ | 4.814240E-01 | 3.881180E-02 | 3.287406E-01 | 4.931767E-01 | 3.256463E-01 |
| $a_8$ | -3.179338E-01 | 6.393319E-02 | -4.532604E-01 | -5.099078E-01 | -1.995500E-01 |
| $a_{10}$ | 0.000000E+00 | -4.315573E-02 | 2.669722E-01 | 2.054036E-01 | 7.666550E-02 |
| $a_{12}$ | 0.000000E+00 | 0.000000E+00 | 0.000000E+00 | 5.288644E-02 | -1.599942E-02 |
| $a_{14}$ | 0.000000E+00 | 0.000000E+00 | 0.000000E+00 | -4.164342E-02 | 0.000000E+00 |

FIG. 25

| Effective focal length (EFL) = 1.317 mm, HFOV (Half field of view) = 51.418 deg., TTL = 6.344 mm, Image height= 1.600 mm, Fno = 2.20 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 611 | 1st lens element | 3.136 | 0.530(T1) | 1.535(n1) | 56.273(V1) | -1.908(f1) | Plastic |
| 612 | | 0.725 | 1.433(G12-TA) | | | | |
| 600 | Aperture stop | INFINITY | -0.030(TA) | | | | |
| 621 | 2nd lens element | 2.296 | 0.855(T2) | 1.535(n2) | 56.273(V2) | 2.133(f2) | Plastic |
| 622 | | -1.976 | 0.099(G23) | | | | |
| 631 | 3rd lens element | 2.130 | 0.300(T3) | 1.663(n3) | 20.401(V3) | -4.219(f3) | Plastic |
| 632 | | 1.141 | 0.167(G34) | | | | |
| 641 | 4th lens element | 1.544 | 1.453(T4) | 1.535(n4) | 56.273(V4) | 1.568(f4) | Plastic |
| 642 | | -1.236 | 0.050(G45) | | | | |
| 651 | 5th lens element | 5.672 | 0.300(T5) | 1.644(n5) | 22.409(V5) | -3.522(f5) | Plastic |
| 652 | | 1.587 | 0.287(G5F) | | | | |
| 661 | IR cut filter | INFINITY | 0.300(TF) | | | | |
| 662 | | INFINITY | 0.600(GFP) | | | | |
| 670 | Image plane | INFINITY | 0.000 | | | | |

FIG. 28

| Aspherical parameters | | | | | |
|---|---|---|---|---|---|
| Surface # | 611 | 612 | 621 | 622 | 631 |
| K | 0.000000E+00 | -1.269240E+00 | 0.000000E+00 | 0.000000E+00 | 0.000000E+00 |
| $a_4$ | 9.899885E-02 | 4.708519E-01 | 4.839208E-02 | 4.003005E-02 | -2.963560E-01 |
| $a_6$ | -7.125300E-02 | 3.126406E-01 | -6.271937E-02 | -4.155894E-02 | 3.235121E-01 |
| $a_8$ | 1.742422E-02 | -6.820292E-01 | 1.656960E-01 | 7.872946E-01 | 8.213705E-03 |
| $a_{10}$ | -1.646986E-03 | 4.786085E-01 | 0.000000E+00 | -2.118980E+00 | -6.347911E-01 |
| $a_{12}$ | 0.000000E+00 | 4.467841E-02 | 0.000000E+00 | 1.853016E+00 | 4.576209E-01 |
| $a_{14}$ | 0.000000E+00 | 0.000000E+00 | 0.000000E+00 | 0.000000E+00 | 0.000000E+00 |
| Surface # | 632 | 641 | 642 | 651 | 652 |
| K | 0.000000E+00 | 0.000000E+00 | 0.000000E+00 | 0.000000E+00 | 0.000000E+00 |
| $a_4$ | -5.566527E-01 | -1.529719E-01 | 5.850606E-02 | -4.980838E-01 | -4.232176E-01 |
| $a_6$ | 5.250934E-01 | 3.387987E-02 | 3.460560E-01 | 5.069348E-01 | 3.056434E-01 |
| $a_8$ | -3.795423E-01 | 6.179407E-02 | -4.504789E-01 | -5.174260E-01 | -1.947899E-01 |
| $a_{10}$ | 0.000000E+00 | -3.634672E-02 | 2.286126E-01 | 2.245081E-01 | 8.264489E-02 |
| $a_{12}$ | 0.000000E+00 | 0.000000E+00 | 0.000000E+00 | 5.288644E-02 | -1.599624E-02 |
| $a_{14}$ | 0.000000E+00 | 0.000000E+00 | 0.000000E+00 | -4.164342E-02 | 0.000000E+00 |

FIG. 29

| Effective focal length (EFL) = 1.611 mm, HFOV (Half field of view) = 49.290 deg., TTL = 5.291 mm, Image height= 1.544 mm, Fno = 2.20 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 711 | 1st lens element | 6.715 | 0.501(T1) | 1.535(n1) | 56.273(V1) | -1.946(f1) | Plastic |
| 712 | | 0.878 | 0.917(G12-TA) | | | | |
| 700 | Aperture stop | INFINITY | -0.045(TA) | | | | |
| 721 | 2nd lens element | 2.369 | 0.499(T2) | 1.535(n2) | 56.273(V2) | 2.123(f2) | Plastic |
| 722 | | -2.024 | 0.403(G23) | | | | |
| 731 | 3rd lens element | 1.769 | 0.300(T3) | 1.663(n3) | 20.401(V3) | -6.410(f3) | Plastic |
| 732 | | 1.164 | 0.118(G34) | | | | |
| 741 | 4th lens element | 1.463 | 0.836(T4) | 1.535(n4) | 56.273(V4) | 1.566(f4) | Plastic |
| 742 | | -1.571 | 0.151(G45) | | | | |
| 751 | 5th lens element | 7.231 | 0.484(T5) | 1.644(n5) | 22.409(V5) | -3.013(f5) | Plastic |
| 752 | | 1.491 | 0.227(G5F) | | | | |
| 761 | IR cut filter | INFINITY | 0.300(TF) | | | | |
| 762 | | INFINITY | 0.600(GFP) | | | | |
| 770 | Image plane | INFINITY | 0.000 | | | | |

FIG. 32

| Aspherical parameters | | | | | |
|---|---|---|---|---|---|
| Surface # | 711 | 712 | 721 | 722 | 731 |
| K | 0.000000E+00 | -1.269240E+00 | 0.000000E+00 | 0.000000E+00 | 0.000000E+00 |
| $a_4$ | 9.256179E-02 | 4.948307E-01 | 5.640927E-02 | -4.055428E-03 | -2.272179E-01 |
| $a_6$ | -7.060982E-02 | 2.912432E-01 | 2.794172E-02 | -5.864989E-02 | 2.615816E-01 |
| $a_8$ | 1.900911E-02 | -2.002316E-01 | 2.458498E-01 | 7.981209E-01 | -2.367909E-01 |
| $a_{10}$ | -2.261560E-03 | 6.369685E-01 | 0.000000E+00 | -1.546711E+00 | 7.675793E-02 |
| $a_{12}$ | 0.000000E+00 | 4.467841E-02 | 0.000000E+00 | 1.853016E+00 | -2.092914E-02 |
| $a_{14}$ | 0.000000E+00 | 0.000000E+00 | 0.000000E+00 | 0.000000E+00 | 0.000000E+00 |
| Surface # | 732 | 741 | 742 | 751 | 752 |
| K | 0.000000E+00 | 0.000000E+00 | 0.000000E+00 | 0.000000E+00 | 0.000000E+00 |
| $a_4$ | -4.679598E-01 | -1.629685E-01 | 1.569921E-01 | -3.298989E-01 | -3.976446E-01 |
| $a_6$ | 3.968692E-01 | 2.360975E-02 | -1.408298E-01 | 8.591149E-02 | 2.350470E-01 |
| $a_8$ | -2.554572E-01 | 7.152132E-02 | 8.782287E-02 | -3.528089E-01 | -1.213649E-01 |
| $a_{10}$ | 0.000000E+00 | -4.498199E-02 | 3.270034E-02 | 7.140102E-01 | 4.570462E-02 |
| $a_{12}$ | 0.000000E+00 | 0.000000E+00 | 0.000000E+00 | -4.973138E-01 | -9.878224E-03 |
| $a_{14}$ | 0.000000E+00 | 0.000000E+00 | 0.000000E+00 | 1.277878E-01 | 0.000000E+00 |

FIG. 33

| Effective focal length (EFL) = 1.097 mm, HFOV (Half field of view) = 55.000 deg., TTL = 7.030 mm, Image height= 1.744 mm, Fno = 2.20 ||||||| |
|---|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 811 | 1st lens element | 2.083 | 0.478(T1) | 1.535(n1) | 56.273(V1) | -1.961(f1) | Plastic |
| 812 | | 0.642 | 1.946(G12-TA) | | | | |
| 800 | Aperture stop | INFINITY | 0.042(TA) | | | | |
| 821 | 2nd lens element | 6.290 | 0.811(T2) | 1.535(n2) | 56.273(V2) | 1.715(f2) | Plastic |
| 822 | | -1.027 | 0.050(G23) | | | | |
| 831 | 3rd lens element | 8.053 | 0.674(T3) | 1.663(n3) | 20.401(V3) | -2.165(f3) | Plastic |
| 832 | | 1.178 | 0.079(G34) | | | | |
| 841 | 4th lens element | 1.548 | 1.380(T4) | 1.535(n4) | 56.273(V4) | 1.562(f4) | Plastic |
| 842 | | -1.253 | 0.050(G45) | | | | |
| 851 | 5th lens element | -7.660 | 0.420(T5) | 1.644(n5) | 22.409(V5) | -6.341(f5) | Plastic |
| 852 | | 8.946 | 0.200(G5F) | | | | |
| 861 | IR cut filter | INFINITY | 0.300(TF) | | | | |
| 862 | | INFINITY | 0.600(GFP) | | | | |
| 870 | Image plane | INFINITY | 0.000 | | | | |

FIG. 36

| Aspherical parameters | | | | | |
|---|---|---|---|---|---|
| Surface # | 811 | 812 | 821 | 822 | 831 |
| K | 0.000000E+00 | -1.269240E+00 | 0.000000E+00 | 0.000000E+00 | 0.000000E+00 |
| $a_4$ | 1.008133E-01 | 5.393878E-01 | -1.118982E-01 | 3.933842E-02 | -2.411962E-01 |
| $a_6$ | -7.412122E-02 | 2.740419E-01 | -2.089689E-01 | -1.544198E-02 | 6.014256E-01 |
| $a_8$ | 1.706486E-02 | -5.453601E-01 | -1.382570E-01 | 7.354144E-01 | -9.410633E-01 |
| $a_{10}$ | -1.722846E-03 | 2.770277E-01 | 0.000000E+00 | -2.253152E+00 | 7.383689E-01 |
| $a_{12}$ | 0.000000E+00 | 4.467841E-02 | 0.000000E+00 | 1.853016E+00 | -1.804904E-01 |
| $a_{14}$ | 0.000000E+00 | 0.000000E+00 | 0.000000E+00 | 0.000000E+00 | 0.000000E+00 |
| Surface # | 832 | 841 | 842 | 851 | 852 |
| K | 0.000000E+00 | 0.000000E+00 | 0.000000E+00 | 0.000000E+00 | 0.000000E+00 |
| $a_4$ | -4.746367E-01 | -1.534297E-01 | 4.445413E-02 | -4.587038E-01 | -3.702882E-01 |
| $a_6$ | 3.775335E-01 | 3.513036E-02 | 3.337235E-01 | 5.067157E-01 | 3.245262E-01 |
| $a_8$ | -1.988017E-01 | 6.462408E-02 | -4.596764E-01 | -5.048092E-01 | -1.756433E-01 |
| $a_{10}$ | 0.000000E+00 | -4.690570E-02 | 2.245996E-01 | 2.319918E-01 | 8.262471E-02 |
| $a_{12}$ | 0.000000E+00 | 0.000000E+00 | 0.000000E+00 | 5.288644E-02 | -1.600021E-02 |
| $a_{14}$ | 0.000000E+00 | 0.000000E+00 | 0.000000E+00 | -4.164342E-02 | 0.000000E+00 |

FIG. 37

| \multicolumn{7}{|c|}{Effective focal length (EFL) = 1.980 mm, HFOV (Half field of view) = 54.999 deg.,} |
| --- | --- | --- | --- | --- | --- | --- |
| \multicolumn{7}{|c|}{TTL = 5.783 mm, Image height= 1.744 mm, Fno = 2.20} |
| Surface # | | Radius (mm) | Thickness / air gap (mm) | Refractive index | Abbe number | Focal length (mm) | Material |
| - | Object | INFINITY | 1000.000 | | | | |
| 911 | 1st lens element | 2.138 | 0.667(T1) | 1.535(n1) | 56.273(V1) | -3.090(f1) | Plastic |
| 912 | | 0.831 | 1.238(G12-TA) | | | | |
| 900 | Aperture stop | INFINITY | -0.060(TA) | | | | |
| 921 | 2nd lens element | 2.006 | 0.555(T2) | 1.535(n2) | 56.273(V2) | 1.976(f2) | Plastic |
| 922 | | -2.021 | 0.289(G23) | | | | |
| 931 | 3rd lens element | 2.976 | 0.300(T3) | 1.663(n3) | 20.401(V3) | -3.484(f3) | Plastic |
| 932 | | 1.248 | 0.079(G34) | | | | |
| 941 | 4th lens element | 1.866 | 1.017(T4) | 1.535(n4) | 56.273(V4) | 1.570(f4) | Plastic |
| 942 | | -1.238 | 0.203(G45) | | | | |
| 951 | 5th lens element | 32.366 | 0.394(T5) | 1.644(n5) | 22.409(V5) | -2.471(f5) | Plastic |
| 952 | | 1.511 | 0.200(G5F) | | | | |
| 961 | IR cut filter | INFINITY | 0.300(TF) | | | | |
| 962 | | INFINITY | 0.600(GFP) | | | | |
| 970 | Image plane | INFINITY | 0.000 | | | | |

FIG. 40

| | Aspherical parameters | | | | |
|---|---|---|---|---|---|
| Surface # | 911 | 912 | 921 | 922 | 931 |
| K | 0.000000E+00 | -1.269240E+00 | 0.000000E+00 | 0.000000E+00 | 0.000000E+00 |
| $a_4$ | 2.839000E-02 | 3.483402E-01 | 2.884050E-02 | 4.912205E-02 | -3.067189E-01 |
| $a_6$ | -6.710935E-02 | -2.914336E-01 | -3.366030E-02 | -8.355698E-02 | 5.453403E-01 |
| $a_8$ | 1.906934E-02 | 2.078583E-01 | 1.252773E-01 | 8.010301E-01 | -6.946948E-01 |
| $a_{10}$ | -2.079304E-03 | -7.432415E-02 | 0.000000E+00 | -1.943472E+00 | 3.777079E-01 |
| $a_{12}$ | 0.000000E+00 | 4.467841E-02 | 0.000000E+00 | 1.853016E+00 | -3.616222E-03 |
| $a_{14}$ | 0.000000E+00 | 0.000000E+00 | 0.000000E+00 | 0.000000E+00 | 0.000000E+00 |
| Surface # | 932 | 941 | 942 | 951 | 952 |
| K | 0.000000E+00 | 0.000000E+00 | 0.000000E+00 | 0.000000E+00 | 0.000000E+00 |
| $a_4$ | -5.359312E-01 | -1.580781E-01 | 2.165194E-02 | -5.496415E-01 | -5.051873E-01 |
| $a_6$ | 6.050560E-01 | 4.189033E-02 | 3.212432E-01 | 4.308015E-01 | 3.077583E-01 |
| $a_8$ | -4.995258E-01 | 7.444983E-02 | -4.602985E-01 | -5.001839E-01 | -2.076662E-01 |
| $a_{10}$ | 0.000000E+00 | -3.283001E-02 | 2.521931E-01 | 2.540483E-01 | 8.588104E-02 |
| $a_{12}$ | 0.000000E+00 | 0.000000E+00 | 0.000000E+00 | 5.299933E-02 | -1.529831E-02 |
| $a_{14}$ | 0.000000E+00 | 0.000000E+00 | 0.000000E+00 | -4.164342E-02 | 0.000000E+00 |

FIG. 41

| \multicolumn{7}{|c|}{Effective focal length (EFL) = 1.437 mm, HFOV (Half field of view) = 55.000 deg., TTL = 6.092 mm, Image height= 1.744 mm, Fno = 2.20} |
|---|---|---|---|---|---|---|
| Surface # | | Radius (mm) | Thickness / air gap (mm) | Refractive index | Abbe number | Focal length (mm) | Material |
| - | Object | INFINITY | 1000.000 | | | | |
| 1011 | 1st lens element | 2.601 | 0.429(T1) | 1.535(n1) | 56.273(V1) | -2.536(f1) | Plastic |
| 1012 | | 0.841 | 1.806(G12-TA) | | | | |
| 1000 | Aperture stop | INFINITY | -0.013(TA) | | | | |
| 1021 | 2nd lens element | 2.336 | 0.522(T2) | 1.535(n2) | 56.273(V2) | 1.983(f2) | Plastic |
| 1022 | | -1.794 | 0.055(G23) | | | | |
| 1031 | 3rd lens element | 3.201 | 0.634(T3) | 1.663(n3) | 20.401(V3) | -3.126(f3) | Plastic |
| 1032 | | 1.159 | 0.098(G34) | | | | |
| 1041 | 4th lens element | 1.630 | 0.981(T4) | 1.535(n4) | 56.273(V4) | 1.476(f4) | Plastic |
| 1042 | | -1.213 | 0.050(G45) | | | | |
| 1051 | 5th lens element | 7.877 | 0.424(T5) | 1.644(n5) | 22.409(V5) | -2.749(f5) | Plastic |
| 1052 | | 1.416 | 0.206(G5F) | | | | |
| 1061 | IR cut filter | INFINITY | 0.300(TF) | | | | |
| 1062 | | INFINITY | 0.600(GFP) | | | | |
| 1070 | Image plane | INFINITY | 0.000 | | | | |

FIG. 44

| Aspherical parameters | | | | | |
|---|---|---|---|---|---|
| Surface # | 1011 | 1012 | 1021 | 1022 | 1031 |
| K | 0.000000E+00 | -1.269240E+00 | 0.000000E+00 | 0.000000E+00 | 0.000000E+00 |
| $a_4$ | 7.800554E-02 | 3.657030E-01 | -3.922048E-02 | -1.984098E-02 | -1.603508E-01 |
| $a_6$ | -7.297803E-02 | -8.908962E-02 | -7.248740E-02 | -1.273144E-01 | 2.986711E-01 |
| $a_8$ | 1.794957E-02 | -1.573950E-02 | -2.776766E-01 | 5.873211E-01 | -4.792293E-01 |
| $a_{10}$ | -1.594947E-03 | -5.880152E-02 | 0.000000E+00 | -2.155902E+00 | 3.139954E-01 |
| $a_{12}$ | 0.000000E+00 | 4.467841E-02 | 0.000000E+00 | 1.853016E+00 | 5.136579E-02 |
| $a_{14}$ | 0.000000E+00 | 0.000000E+00 | 0.000000E+00 | 0.000000E+00 | 0.000000E+00 |
| Surface # | 1032 | 1041 | 1042 | 1051 | 1052 |
| K | 0.000000E+00 | 0.000000E+00 | 0.000000E+00 | 0.000000E+00 | 0.000000E+00 |
| $a_4$ | -3.773826E-01 | -1.198325E-01 | 4.335327E-02 | -5.592510E-01 | -4.875977E-01 |
| $a_6$ | 3.502946E-01 | 4.445083E-02 | 3.267420E-01 | 4.336999E-01 | 3.289233E-01 |
| $a_8$ | -2.429559E-01 | 6.130416E-02 | -4.577194E-01 | -4.868466E-01 | -2.031961E-01 |
| $a_{10}$ | 0.000000E+00 | -3.883862E-02 | 2.627501E-01 | 2.653745E-01 | 8.269930E-02 |
| $a_{12}$ | 0.000000E+00 | 0.000000E+00 | 0.000000E+00 | 5.288644E-02 | -1.622034E-02 |
| $a_{14}$ | 0.000000E+00 | 0.000000E+00 | 0.000000E+00 | -4.164342E-02 | 0.000000E+00 |

FIG. 45

| Embodiment | 1st | 2nd | 3rd | 4th | 5th | 6th | 7th | 8th | 9th | 10th |
|---|---|---|---|---|---|---|---|---|---|---|
| EFL | 1.454 | 1.330 | 1.800 | 0.888 | 0.880 | 1.317 | 1.611 | 1.097 | 1.980 | 1.437 |
| T1 | 0.500 | 0.378 | 0.300 | 1.038 | 0.435 | 0.530 | 0.501 | 0.478 | 0.667 | 0.429 |
| G12 | 1.499 | 1.495 | 0.990 | 1.557 | 1.915 | 1.403 | 0.872 | 1.988 | 1.178 | 1.793 |
| T2 | 0.639 | 0.513 | 0.490 | 0.365 | 0.437 | 0.855 | 0.499 | 0.811 | 0.555 | 0.522 |
| G23 | 0.058 | 0.168 | 0.050 | 0.050 | 0.347 | 0.099 | 0.403 | 0.050 | 0.289 | 0.055 |
| T3 | 0.434 | 0.340 | 0.300 | 0.300 | 0.359 | 0.300 | 0.300 | 0.674 | 0.300 | 0.634 |
| G34 | 0.087 | 0.095 | 0.167 | 0.069 | 0.087 | 0.167 | 0.118 | 0.079 | 0.079 | 0.098 |
| T4 | 1.396 | 0.736 | 0.640 | 0.894 | 0.936 | 1.453 | 0.836 | 1.380 | 1.017 | 0.981 |
| G45 | 0.050 | 0.050 | 0.251 | 0.050 | 0.050 | 0.050 | 0.151 | 0.050 | 0.203 | 0.050 |
| T5 | 0.481 | 0.665 | 0.300 | 0.300 | 0.300 | 0.300 | 0.484 | 0.420 | 0.394 | 0.424 |
| G5F | 0.200 | 0.236 | 0.200 | 0.200 | 0.200 | 0.287 | 0.227 | 0.200 | 0.200 | 0.206 |
| TF | 0.300 | 0.300 | 0.300 | 0.300 | 0.300 | 0.300 | 0.300 | 0.300 | 0.300 | 0.300 |
| GFP | 0.600 | 0.600 | 0.600 | 0.600 | 0.600 | 0.600 | 0.600 | 0.600 | 0.600 | 0.600 |
| BFL | 1.100 | 1.136 | 1.100 | 1.100 | 1.100 | 1.187 | 1.127 | 1.100 | 1.100 | 1.106 |
| ALT | 3.450 | 2.632 | 2.030 | 2.897 | 2.466 | 3.438 | 2.621 | 3.763 | 2.932 | 2.990 |
| AAG | 1.693 | 1.808 | 1.458 | 1.726 | 2.398 | 1.719 | 1.544 | 2.167 | 1.750 | 1.996 |
| TTL | 6.243 | 5.576 | 4.588 | 5.723 | 5.964 | 6.344 | 5.291 | 7.030 | 5.783 | 6.092 |
| TL | 5.143 | 4.441 | 3.488 | 4.623 | 4.864 | 5.157 | 4.164 | 5.930 | 4.683 | 4.986 |
| EFL/T5 | 3.026 | 2.000 | 5.999 | 2.960 | 2.934 | 4.389 | 3.331 | 2.612 | 5.029 | 3.388 |
| G12/T1 | 3.000 | 3.953 | 3.300 | 1.500 | 4.400 | 2.647 | 1.739 | 4.155 | 1.767 | 4.178 |
| (T2+G23)/T1 | 1.395 | 1.800 | 1.800 | 0.400 | 1.800 | 1.800 | 1.800 | 1.800 | 1.266 | 1.344 |
| (G12+G45)/T2 | 2.424 | 3.012 | 2.533 | 4.400 | 4.500 | 1.700 | 2.049 | 2.512 | 2.491 | 3.531 |
| ImgH/G12 | 1.164 | 1.166 | 1.761 | 1.120 | 0.911 | 1.243 | 1.771 | 0.877 | 1.480 | 0.973 |
| TTL/(G12+G23+G34) | 3.800 | 3.171 | 3.800 | 3.415 | 2.540 | 3.800 | 3.800 | 3.321 | 3.739 | 3.131 |
| (AAG+BFL)/T4 | 2.000 | 4.000 | 4.000 | 3.160 | 3.740 | 2.000 | 3.193 | 2.368 | 2.802 | 3.163 |
| TL/ImgH | 2.949 | 2.546 | 2.000 | 2.651 | 2.789 | 2.957 | 2.697 | 3.400 | 2.685 | 2.859 |
| EFL/BFL | 1.322 | 1.171 | 1.636 | 0.807 | 0.800 | 1.110 | 1.429 | 0.997 | 1.800 | 1.300 |
| G12/T4 | 1.073 | 2.032 | 1.548 | 1.741 | 2.047 | 0.966 | 1.043 | 1.441 | 1.158 | 1.829 |
| (G34+T4)/T3 | 3.414 | 2.443 | 2.690 | 3.212 | 2.852 | 5.400 | 3.180 | 2.165 | 3.654 | 1.700 |
| (G12+G45)/T4 | 1.109 | 2.100 | 1.940 | 1.797 | 2.100 | 1.000 | 1.223 | 1.477 | 1.358 | 1.880 |
| (T1+T2+T3+T5)/G12 | 1.370 | 1.268 | 1.404 | 1.287 | 0.799 | 1.415 | 2.046 | 1.199 | 1.626 | 1.121 |
| ALT/(G12+G23+G34) | 2.100 | 1.497 | 1.681 | 1.729 | 1.050 | 2.059 | 1.882 | 1.778 | 1.896 | 1.537 |
| (AAG+BFL)/(T2+T3) | 2.602 | 3.451 | 3.238 | 4.249 | 4.400 | 2.517 | 3.340 | 2.200 | 3.335 | 2.682 |
| TTL/ALT | 1.810 | 2.118 | 2.261 | 1.975 | 2.419 | 1.845 | 2.019 | 1.868 | 1.972 | 2.037 |

FIG. 46

OPTICAL IMAGING LENS

CROSS-REFERENCE TO RELATED APPLICATION

This application claims priority to P.R.C. Patent Application No. 201710728733.0 titled "Optical Imaging Lens", filed Aug. 23, 2017 with the State Intellectual Property Office of the People's Republic of China (SIPO).

TECHNICAL FIELD

The present disclosure relates to an optical imaging lens, and particularly, relates to an optical imaging lens having five lens elements.

BACKGROUND

The ever-increasing demand for smaller sized electrical devices, such as cell phones, digital cameras, tablet computers, personal digital assistants (PDAs), vehicle electronics, etc. has triggered a corresponding need for smaller sized photography modules contained within the device. Such modules may include optical imaging lenses, module housing units, image sensors, etc. Size reductions may be achieved from various aspects of the electrical devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenge. Furthermore, achieving a high view angle and a great aperture size are important in certain applications, such as situations where a photography module is used in vehicles.

In light of the above issues, designing an optical imaging lens with a shorter length is not easily achieved by merely decreasing the size of each element proportionally. This is especially true for an optical imaging lens mounted with five lens elements, in which the distance between an object-side surface of the first lens element and an imaging plane along an optical axis may be great. Size reductions of an optical imaging lens cannot be achieved simply by proportionally shrinking the size of each element therein. Various aspects of the optical imaging lens, such as production difficulty, yield, material property, etc. should be taken into consideration.

Therefore, production of a size-reduced optical imaging lens presents higher technical barriers and challenges than that of a conventional lens. Accordingly, achieving good optical characteristics in view of the various relevant considerations and technical barriers is a challenge in the industry.

SUMMARY

The present disclosure provides for optical imaging lenses. By controlling the convex or concave shape of the surfaces of the lens elements, the length of the optical imaging lens may be shortened, the HFOV and aperture of the optical imaging lens may be broadened, and meanwhile good imaging quality and system functionality may be maintained.

In an example embodiment, an optical imaging lens may comprise five lens elements, here called first, second, third, fourth, and fifth lens elements and positioned sequentially from an object side to an image side along an optical axis. Each of the first, second, third, fourth, and fifth lens elements has refracting power, an object-side surface facing toward the object side and allowing light to pass and an image-side surface facing toward the image side and allowing light to pass.

In the specification, parameters used here are: a thickness of the first lens element along the optical axis, represented by T1, an air gap between the first lens element and the second lens element along the optical axis, represented by G12, the distance between an aperture stop and the object-side surface of the next lens element along the optical axis, represented by TA, the distance between the image-side surface of the first lens element and the aperture stop along the optical axis, represented by G12−TA, a thickness of the second lens element along the optical axis, represented by T2, an air gap between the second lens element and the third lens element along the optical axis, represented by G23, a thickness of the third lens element along the optical axis, represented by T3, an air gap between the third lens element and the fourth lens element along the optical axis, represented by G34, a thickness of the fourth lens element along the optical axis, represented by T4, an air gap between the fourth lens element and the fifth lens element along the optical axis, represented by G45, a thickness of the fifth lens element along the optical axis, represented by T5, a distance between the image-side surface of the fifth lens element and the object-side surface of a filtering unit along the optical axis, represented by G5F, a thickness of the filtering unit along the optical axis, represented by TF, a distance between the image-side surface of the filtering unit and an image plane along the optical axis, represented by GFP, a focal length of the first lens element, represented by f1, a focal length of the second lens element, represented by f2, a focal length of the third lens element, represented by f3, a focal length of the fourth lens element, represented by f4, a focal length of the fifth lens element, represented by f5, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, the refractive index of the filtering unit, represented by nf, an abbe number of the first lens element, represented by V1, an abbe number of the second lens element, represented by V2, an abbe number of the third lens element, represented by V3, an abbe number of the fourth lens element, represented by V4, an abbe number of the fifth lens element, represented by V5, an effective focal length of the optical imaging lens, represented by EFL or f, a distance between the object-side surface of the first lens element and the image-side surface of the fifth lens element along the optical axis, represented by TL, a distance between the object-side surface of the first lens element and the image plane along the optical axis, represented by TTL, a sum of the thicknesses of all five lens elements along the optical axis, i.e. a sum of T1, T2, T3, T4 and T5, represented by ALT, a sum of all air gaps from the first lens element to the fifth lens element along the optical axis, i.e. a sum of G12, G23, G34 and G45, represented by AAG, a back focal length of the optical imaging lens, which is defined as the distance from the image-side surface of the fifth lens element to the image plane along the optical axis, i.e. a sum of G5F, TF and GFP, and represented by BFL, and an image height of the optical imaging lens, represented by ImgH.

In an aspect of the present disclosure, in the optical imaging lens, the first lens element may have negative refracting power, the image-side surface of the second lens element may comprise a convex portion in a vicinity of a periphery of the second lens element, the third lens element may have negative refracting power, the object-side surface of the third lens element may comprise a convex portion in a vicinity of a periphery of the third lens element, the object-side surface of the fourth lens element may comprise a convex portion in a vicinity of the optical axis, the image-side surface of the fourth lens element may comprise a convex portion in a vicinity of the optical axis or a periphery of the fourth lens element, the image-side surface of the fifth lens element may comprise a concave portion in a vicinity of the optical axis, and the optical imaging lens comprises no other lenses having refracting power beyond the five lens elements.

In another example embodiment, other inequality(s), such as those relating to the ratio among parameters could be taken into consideration. For example:

| | |
|---|---|
| $EFL/T5 \geq 6.000$ | Inequality (1); |
| $G12/T1 \leq 4.400$ | Inequality (2); |
| $(T2+G23)/T1 \leq 1.800$ | Inequality (3); |
| $(G12+G45)/T2 \leq 4.500$ | Inequality (4); |
| $ImgH/G12 \leq 2.000$ | Inequality (5); |
| $TTL/(G12+G23+G34) \leq 3.800$ | Inequality (6); |
| $(AAG+BFL)/T4 \leq 4.000$ | Inequality (7); |
| $TL/ImgH \leq 4.600$ | Inequality (8); |
| $EFL/BFL \leq 2.500$ | Inequality (9); |
| $G12/T4 \leq 2.600$ | Inequality (10); |
| $(G34+T4)/T3 \leq 5.400$ | Inequality (11); |
| $(G12+G45)/T4 \leq 2.100$ | Inequality (12); |
| $(T1+T2+T3+T5)/G12 \leq 2.600$ | Inequality (13); |
| $ALT/(G12+G23+G34) \leq 2.200$ | Inequality (14); |
| $(AAG+BFL)/(T2+T3) \leq 4.400$ | Inequality (15); |
| $TTL/ALT \leq 2.700$ | Inequality (16); |
| $V2 > (V3+V5)$ | Inequality (17); and/or |
| $V4 > (V3+V5)$ | Inequality (18). |

In some example embodiments, more details about the convex or concave surface structure, refracting power or chosen material etc. could be incorporated for one specific lens element or broadly for plural lens elements to enhance the control for the system performance and/or resolution. It is noted that the details listed here could be incorporated in example embodiments if no inconsistency occurs.

The above example embodiments are not limited and could be selectively incorporated in other embodiments described herein.

Through controlling the convex or concave shape of the surfaces and at lease one inequality, the optical imaging lens in example embodiments achieve good imaging quality, effectively shorten the length of the optical imaging lens and broaden the HFOV and aperture of the optical imaging lens.

BRIEF DESCRIPTION OF THE DRAWINGS

Example embodiments will be more readily understood from the following detailed description when read in conjunction with the appended drawing, in which:

FIG. 3 depicts a cross-sectional view showing the relation between the shape of a portion and the effective radius of a first example;

FIG. 4 depicts a cross-sectional view showing the relation between the shape of a portion and the effective radius of a second example;

FIG. 5 depicts a cross-sectional view showing the relation between the shape of a portion and the effective radius of a third example;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 46 depicts a table for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of all ten example embodiments.

DETAILED DESCRIPTION

Figures 1, 2:
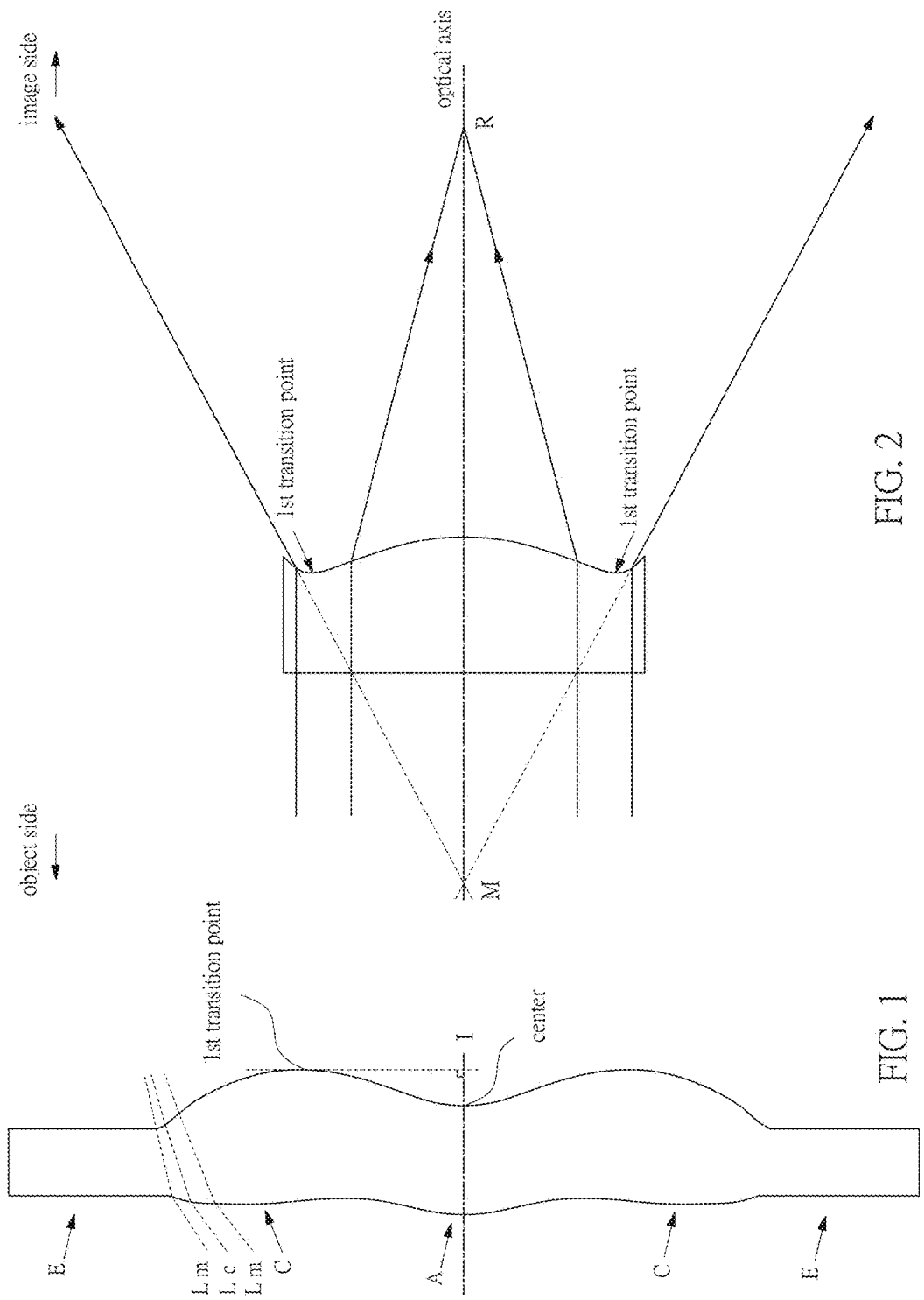
FIG. 1 depicts a cross-sectional view of one single lens element according to the present disclosure.
FIG. 2 depicts a cross-sectional view showing the relation between the shape of a portion and the position where a collimated ray meets the optical axis.

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements are not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those described portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, may appear within the clear aperture of the image-side surface of the lens element. Portion I is a portion in a vicinity of the optical axis, and portion II is a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element is different from the shape of the portion in a vicinity of the optical axis; the portion in a vicinity of a periphery of the lens element may have a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) may have a convex shape. What is more, there is another portion having a concave shape existing between the first and second transition point (portion II).

Referring to a third example depicted in FIG. 5, no transition point may exist on the object-side surface of the lens element. In this case, the portion between 0~50% of the effective radius (radius of the clear aperture) may be determined as the portion in a vicinity of the optical axis, and the portion between 50~100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

In the present disclosure, examples of an optical imaging lens which is a prime lens are provided. Example embodiments of an optical imaging lens may comprise a first lens element, a second lens element, a third lens element, a fourth lens element and a fifth lens element. Each of the lens elements may comprise refracting power, an object-side surface facing toward an object side and an image-side surface facing toward an image side, both of which and allow light to pass, and a central thickness defined along the optical axis. These lens elements may be arranged sequentially from the object side to the image side along an optical axis, and example embodiments of the lens may comprise no other lenses having refracting power beyond the five lens elements. Through controlling the convex or concave shape of the surfaces and at lease one inequality, the optical imaging lens in example embodiments achieve good imaging quality, effectively shorten the length of the optical imaging lens and broaden the HFOV and aperture of the optical imaging lens.

Preferably, the lens elements are designed in light of the optical characteristics and the length of the optical imaging lens. For example, the negative refracting power of the first lens element and the convex portion in a vicinity of the periphery formed on the image-side surface of the second lens element may assist in enlarging HFOV; the aperture stop between the first and second lens elements may also assist in enlarging HFOV. The negative refracting power of the third lens element and the convex portion in a vicinity of the periphery portion of the third lens element formed on the object-side surface thereof may assist in adjusting aberration generated at the first and second lens elements. Together with the convex portion in a vicinity of the optical axis formed on the object-side surface of the fourth lens element and either the convex portion in a vicinity of the optical axis or the convex portion in a vicinity of the periphery of the fourth lens element formed on the image-side surface thereof, the imaging quality may be improved even better by adjusting aberration generated at the first, second and third lens elements. Further, the concave portion in a vicinity of the optical axis formed on the image-side surface of the fifth lens element may assist in adjusting the aberration which occurs in the first, second, third and fourth lens elements.

When the Inequality (17) or (18) is satisfied, the chromatic aberration of the optical imaging lens may be adjusted to facilitate the dual band function.

Additionally, to keep values of system focal length and other parameters of the optical imaging lens in a proper range, to avoid from any excessive value of the parameters which is unfavorable to adjust aberration of the whole system of the optical imaging lens, and to avoid from any insufficient value of the parameters which increase the production difficulty of the optical imaging lens, here are provided with Inequalities (1) and (9). Preferably, the value of EFL/T5 may preferably be within about 2.000~6.000; and the value of EFL/BFL may preferably be within about 0.800~2.500.

To sustain the relation between the thickness of the lens elements and/or the air gaps between the lens elements a proper value, thereby to avoid from any excessive value of the parameters which is unfavorable to thicken the length of the whole system of the optical imaging lens and to avoid from any insufficient value of the parameters which increase the production difficulty of the optical imaging lens, the optical imaging lens may be better configured if it satisfies Inequalities (2)~(8) and/or (10)~(16). Preferably, the value of G12/T1 may preferably be within about 1.500~4.400; the value of (T2+G23)/T1 may preferably be within 0.300~1.800; the value of (G12+G45)/T2 may preferably be within about 1.700~4.500; the value of ImgH/G12 may preferably be within about 0.600~2.000; the value of TTL/(G12+G23+G34) may preferably be within about 1.800~3.800; the value of (AAG+BFL)/T4 may preferably be within about 2.000~4.000; the value of TL/ImgH≤4.600 may preferably be within about 2.000~4.600; the value of G12/T4 may preferably be within about 0.700~2.600; the value of (G34+T4)/T3 may preferably be within about 1.700~5.400; the value of (G12+G45)/T4 may preferably be within about 1.000~2.100; the value of (T1+T2+T3+T5)/G12 may preferably be within about 0.500~2.600; the value of ALT/(G12+G23+G34) may preferably be within about 1.000~2.200; the value of (AAG+BFL)/(T2+T3) may preferably be within about 2.200~4.400; and the value of TTL/ALT may preferably be within about 1.500~2.700.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface or refracting power could be incorporated for one specific lens element or broadly for plural lens elements to enhance the control for the system performance and/or resolution, or promote the yield. For example, in an example embodiment, a convex portion in a vicinity of the optical axis may be formed on the object-side surface of the first lens element, each lens element may be made from all kinds of transparent material, such as glass, resin, etc. It is noted that the details listed here could be incorporated in example embodiments if no inconsistency occurs.

Figure 6:
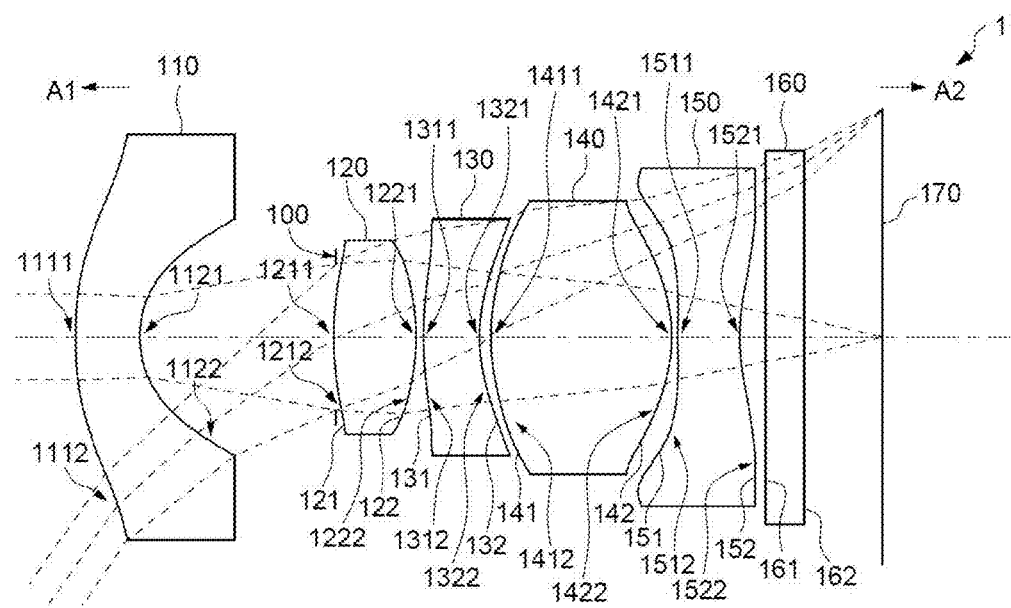
FIG. 6 depicts a cross-sectional view of a first embodiment of an optical imaging lens having five lens elements according to the present disclosure.
Figure 7:
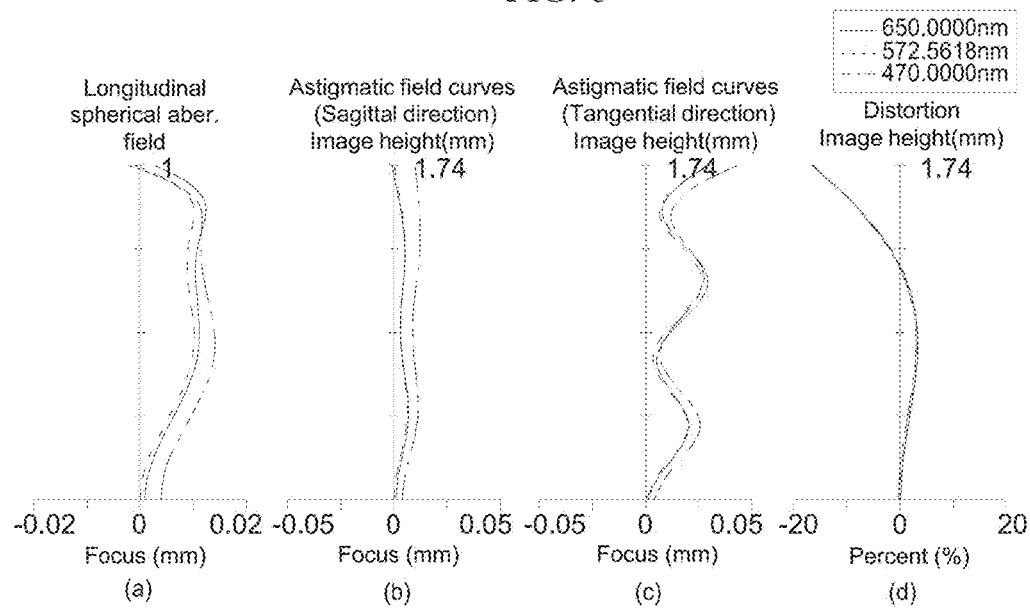
FIG. 7 depicts a chart of longitudinal spherical aberration and other kinds of optical aberrations of a first embodiment of the optical imaging lens according to the present disclosure.

Several example embodiments and associated optical data will now be provided for illustrating example embodiments of an optical imaging lens with short length, good optical characteristics, a wide view angle and/or a low f-number. Reference is now made to FIGS. 6-9. FIG. 6 illustrates an example cross-sectional view of an optical imaging lens 1 having five lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, an aperture stop 100, a second lens element 120, a third lens element 130, a fourth lens element 140 and a fifth lens element 150. A filtering unit 160 and an image plane 170 of an image sensor are positioned at the image side A2 of the optical lens 1. Each of the first, second, third, fourth and fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The filtering unit 160, positioned between the fifth lens element 150 and the image plane 170, selectively absorbs light with specific wavelength from the light passing optical imaging lens 1. The example embodiment of the filtering unit 160 which may selectively absorb light with specific wavelength from the light passing optical imaging lens 1 is an IR cut filter (infrared cut filter). Then, IR light may be absorbed, and this may prohibit the IR light, which is not seen by human eyes, from producing an image on the image plane 170.

Please note that during the normal operation of the optical imaging lens 1, the distance between any two adjacent lens elements of the first, second, third, fourth and fifth lens elements 110, 120, 130, 140, 150 is a unchanged value, i.e. the optical imaging lens 1 is a prime lens.

Example embodiments of each lens element of the optical imaging lens 1, which may be constructed by glass, plastic material or other transparent material, will now be described with reference to the drawings.

An example embodiment of the first lens element 110, which may be constructed by plastic material, may have negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which may be constructed by plastic material, may have positive refracting power. The object-side surface 121 may be a convex surface comprising a convex portion 1211 in a vicinity of the optical axis and a convex portion 1212 in a vicinity of a periphery of the second lens element 120. The image-side surface 122 may be a convex surface comprising a convex portion 1221 in a vicinity of the optical axis and a convex portion 1222 in a vicinity of the periphery of the second lens element 120.

An example embodiment of the third lens element 130, which may be constructed by plastic material, may have negative refracting power. The object-side surface 131 may be a convex surface comprising a convex portion 1311 in a vicinity of the optical axis and a convex portion 1312 in a vicinity of a periphery of the third lens element 130. The image-side surface 132 may be a concave surface comprising a concave portion 1321 in a vicinity of the optical axis and a concave portion 1322 in a vicinity of the periphery of the third lens element 130.

An example embodiment of the fourth lens element 140, which may be constructed by plastic material, may have positive refracting power. The object-side surface 141 may be a convex surface comprising a convex portion 1411 in a vicinity of the optical axis and a convex portion 1412 in a vicinity of a periphery of the fourth lens element 140. The image-side surface 142 may be a convex surface comprising a convex portion 1421 in a vicinity of the optical axis and a convex portion 1422 in a vicinity of the periphery of the fourth lens element 140.

An example embodiment of the fifth lens element 150, which may be constructed by plastic material, may have negative refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

In example embodiments, air gaps may exist between each pair of adjacent lens elements, as well as between the fifth lens element 150 and the filtering unit 160, and the filtering unit 160 and the image plane 170 of the image sensor. Please note, in other embodiments, any of the aforementioned air gaps may or may not exist. For example, the profiles of opposite surfaces of any two adjacent lens elements may correspond to each other, and in such situations, the air gap may not exist.

FIG. 8 depicts the optical characteristics of each lens elements in the optical imaging lens 1 of the present embodiment, in which the distance between the image-side surface of the first lens element and the aperture stop along the optical axis is represented by G12–TA. Please also refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT corresponding to the present embodiment.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140 and the object-side surface 151 and the image-side surface 152 of the fifth lens element 150, are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9.

Please refer to FIG. 7(a), longitudinal spherical aberration of the optical imaging lens in the present embodiment is shown in coordinates in which the horizontal axis represents focus and the vertical axis represents field of view, and FIG. 7(b), astigmatism aberration of the optical imaging lens in the present embodiment in the sagittal direction is shown in coordinates in which the horizontal axis represents focus and the vertical axis represents image height, and FIG. 7(c), astigmatism aberration in the tangential direction of the optical imaging lens in the present embodiment is shown in coordinates in which the horizontal axis represents focus and the vertical axis represents image height, and FIG. 7(d), distortion aberration of the optical imaging lens in the present embodiment is shown in coordinates in which the horizontal axis represents percentage and the vertical axis represents image height.

The curves of different wavelengths (470 nm, 555 nm, 650 nm) are closed to each other. This represents that off-axis light with respect to these wavelengths is focused around an image point. From the vertical deviation of each curve shown therein, the offset of the off-axis light relative to the image point may be within about ±0.02 mm. Therefore, the present embodiment improves the longitudinal spherical aberration with respect to different wavelengths. For astigmatism aberration in the sagittal direction, the focus variation with respect to the three wavelengths in the whole field may fall within about ±0.025 mm, for astigmatism aberration in the tangential direction, the focus variation with respect to the three wavelengths in the whole field may fall within about ±0.05 mm, and the variation of the distortion aberration may be within about ±20%.

According to the value of the aberrations, it is shown that the optical imaging lens 1 of the present embodiment, with the length as short as about 6.243 mm, HFOV as great as about 55 degrees and the Fno as small as about 2.2, may be capable of providing good imaging quality as well as good optical characteristics.

Figure 10:
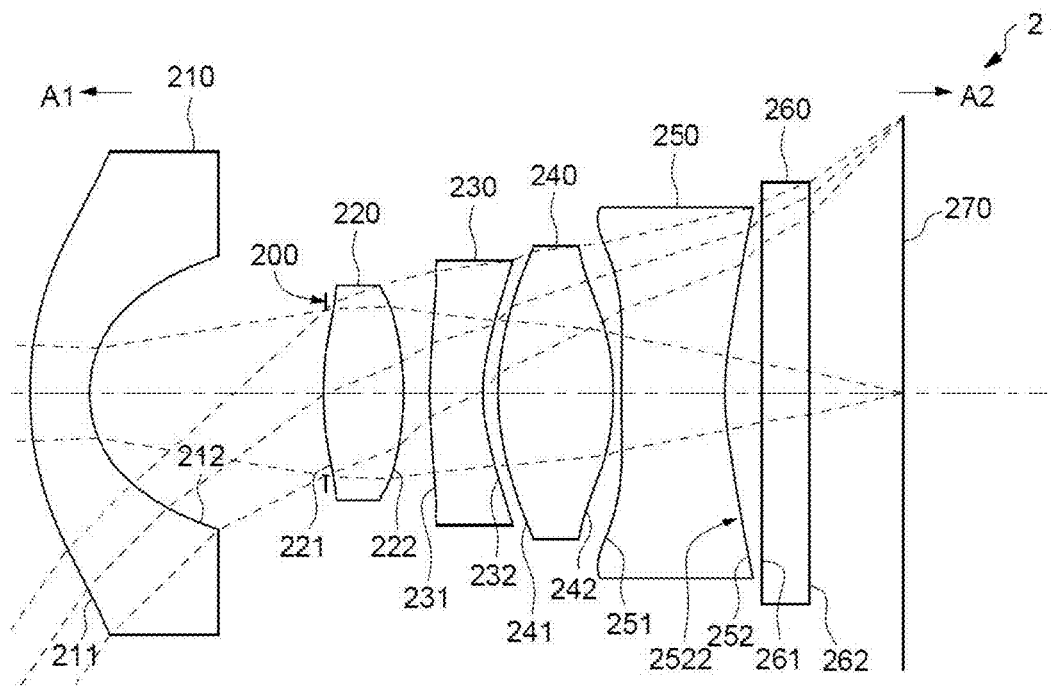
FIG. 10 depicts a cross-sectional view of a second embodiment of an optical imaging lens having five lens elements according to the present disclosure.
Figure 11:
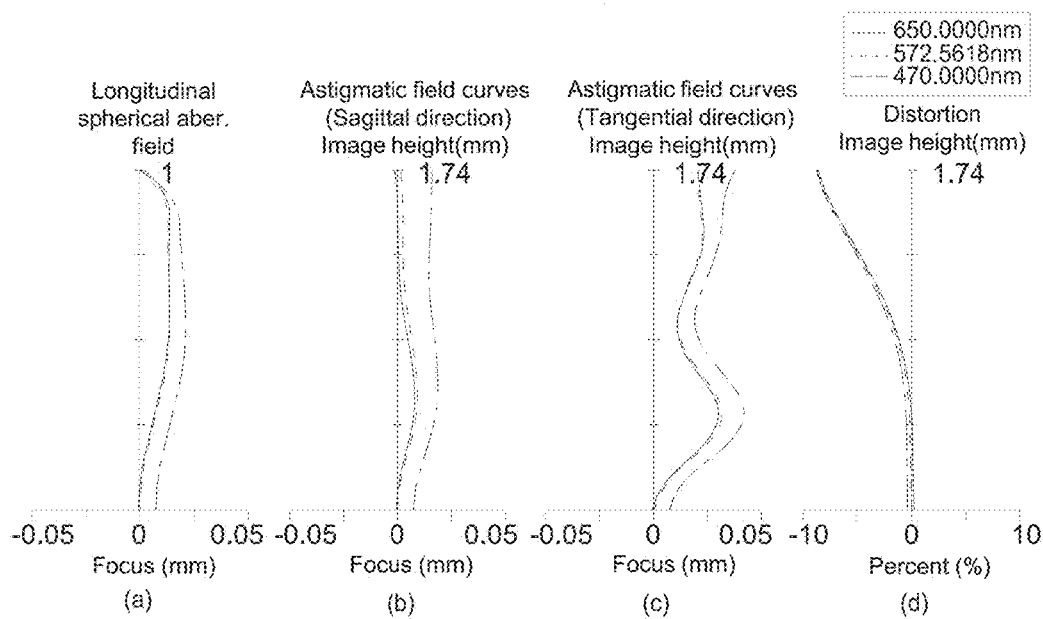
FIG. 11 depicts a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, an aperture stop 200, a second lens element 220, a third lens element 230, a fourth lens element 240 and a fifth lens element 250.

The differences between the second embodiment and the first embodiment may include the radius of curvature, thickness of each lens element, the distance of each air gap, aspherical data, related optical parameters, such as back focal length, and the configuration of the concave/convex shape of the image-side surface 252; but the configuration of the concave/convex shape of surfaces, comprising the object-side surfaces 211, 221, 231, 241, 251 facing to the object side A1 and the image-side surfaces 212, 222, 232, 242 facing to the image side A2, and positive or negative configuration of the refracting power of each lens element are similar to those in the first embodiment. Here and in the embodiments hereinafter, for clearly showing the drawings of the present embodiment, only the surface shapes which are different from that in the first embodiment are labeled. Specifically, the difference of configuration of surface shape is: the image-side surface 252 of the fifth lens element 250 may comprise a concave portion 2522 in a vicinity of a periphery of the fifth lens element 250. Please refer to FIG. 12 for the optical characteristics of each lens elements in the optical imaging lens 2 the present embodiment, and please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of the present embodiment.

As the longitudinal spherical aberration shown in FIG. 11(a), the offset of the off-axis light relative to the image point may be within about ±0.025 mm. As the astigmatism aberration in the sagittal direction shown in FIG. 11(b), the focus variation with regard to the three wavelengths in the whole field may fall within about ±0.025 mm. As the astigmatism aberration in the tangential direction shown in FIG. 11(c), the focus variation with regard to the three wavelengths in the whole field may fall within about ±0.05 mm. As shown in FIG. 11(d), the variation of the distortion aberration may be within about ±10%. Compared with the first embodiment, the distortion of the optical imaging lens 2 is less.

According to the value of the aberrations, it is shown that the optical imaging lens 2 of the present embodiment, with the length as short as about 5.576, the HFOV as large as about 55 degrees and the Fno as small as about 2.2, may be capable of providing good imaging quality. Compared with the optical imaging lens 1 of the first embodiment, the length of the optical imaging lens 2 of the present embodiment is shorter.

Figure 14:
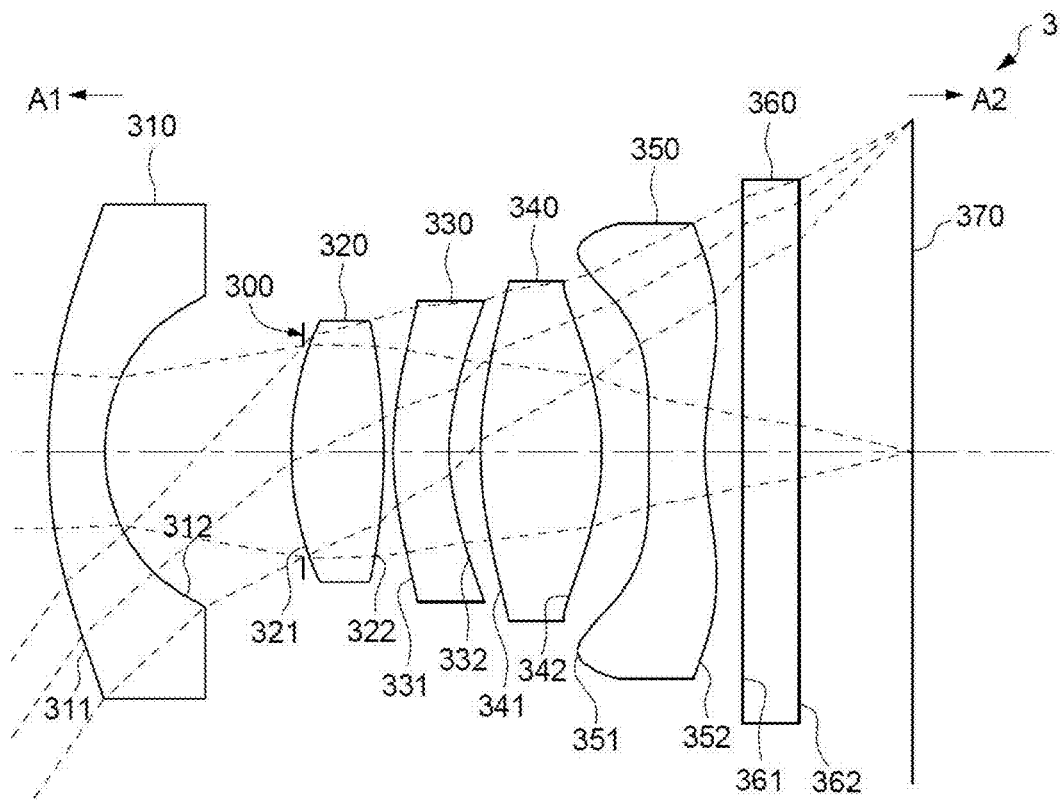
FIG. 14 depicts a cross-sectional view of a third embodiment of an optical imaging lens having five lens elements according to the present disclosure.
Figure 15:
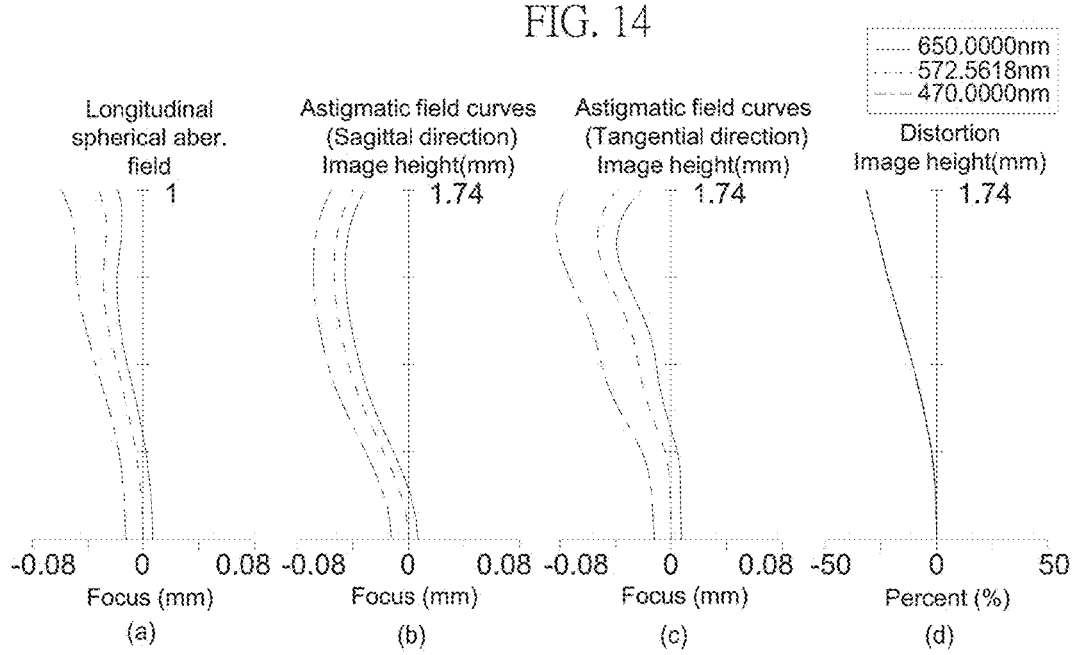
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, an aperture stop 300, a second lens element 320, a third lens element 330, a fourth lens element 340 and a fifth lens element 350.

The differences between the third embodiment and the first embodiment may include the radius of curvature and thickness of each lens element, the distance of each air gap, aspherical data and related optical parameters, such as back focal length; but the configuration of the concave/convex shape of surfaces, comprising the object-side surfaces 311, 321, 331, 341, 351 facing to the object side A1 and the image-side surfaces 312, 322, 332, 342, 352 facing to the image side A2, and positive or negative configuration of the refracting power of each lens element are similar to those in the first embodiment. Please refer to FIG. 16 for the optical characteristics of each lens elements in the optical imaging lens 3 of the present embodiment, and please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T+T2+T3+T5)/G12, ALT/(G12+G23+G34), (AAG+BFL)/(T2+T3) and TTL/ALT of the present embodiment.

As the longitudinal spherical aberration shown in FIG. 15(*a*), the offset of the off-axis light relative to the image point may be within about ±0.08 mm. As the astigmatism aberration in the sagittal direction shown in FIG. 15(*b*), the focus variation with regard to the three wavelengths in the whole field may fall within about ±0.08 mm. As the astigmatism aberration in the tangential direction shown in FIG. 15(*c*), the focus variation with regard to the three wavelengths in the whole field may fall within about ±0.08 mm. As shown in FIG. 15(*d*), the variation of the distortion aberration may be within about ±50%.

According to the value of the aberrations, it is shown that the optical imaging lens 3 of the present embodiment, with the length as short as about 4.588 mm, the HFOV as large as about 66.282 degrees and the Fno as small as about 2.2, may be capable of providing good imaging quality. Compared with the optical imaging lens 1 of the first embodiment, the length of the optical imaging lens 3 of the present embodiment is shorter.

Figure 18:
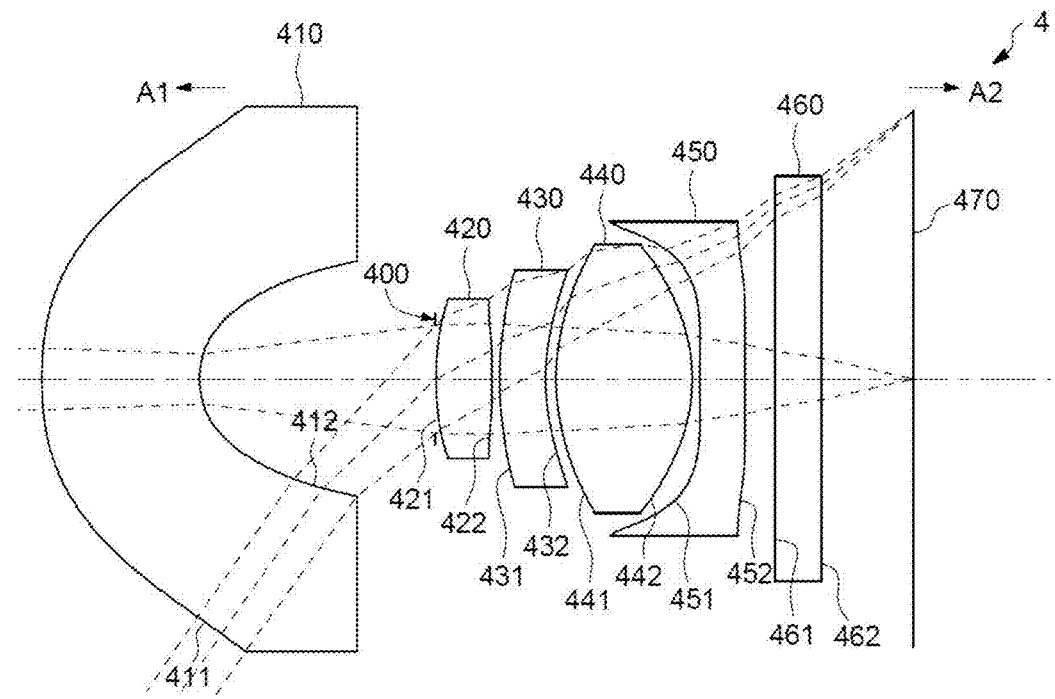
FIG. 18 depicts a cross-sectional view of a fourth embodiment of an optical imaging lens having five lens elements according to the present disclosure.
Figure 19:
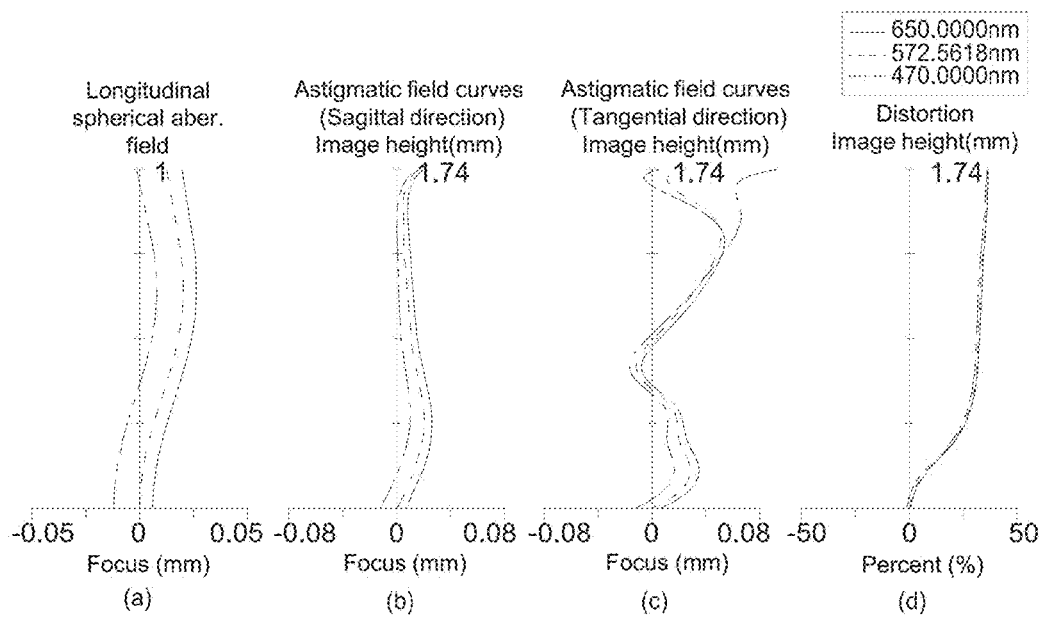
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, an aperture stop 400, a second lens element 420, a third lens element 430, a fourth lens element 440 and a fifth lens element 450.

The differences between the fourth embodiment and the first embodiment may include the radius of curvature and thickness of each lens element, the distance of each air gap, aspherical data, related optical parameters, such as back focal length, and the positive refracting power of the fifth lens element 450; but the configuration of the concave/convex shape of surfaces, comprising the object-side surfaces 411, 421, 431, 441, 451 facing to the object side A1 and the image-side surfaces 412, 422, 432, 442, 452 facing to the image side A2, and positive or negative configuration of the refracting power of the first, second third and fourth lens elements 410, 420, 430, 440 are similar to those in the first embodiment. Please refer to FIG. 20 for the optical characteristics of each lens elements in the optical imaging lens 4 of the present embodiment, please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of the present embodiment.

As the longitudinal spherical aberration shown in FIG. 19(*a*), the offset of the off-axis light relative to the image point may be within about ±0.05 mm. As the astigmatism aberration in the sagittal direction shown in FIG. 19(*b*), the focus variation with regard to the three wavelengths in the whole field may fall within about ±0.04 mm. As the astigmatism aberration in the tangential direction shown in FIG. 19(*c*), the focus variation with regard to the three wavelengths in the whole field may fall within about ±0.08 mm. As shown in FIG. 19(*d*), the variation of the distortion aberration may be within about ±50%.

According to the value of the aberrations, it is shown that the optical imaging lens 4 of the present embodiment, with the length as short as about 5.723 mm, the HFOV as large as about 55 degrees and the Fno as small as about 2.2, may be capable of providing good imaging quality. Compared with the optical imaging lens 1 of the first embodiment, the length of the optical imaging lens 4 of the present embodiment is shorter.

Figure 22:
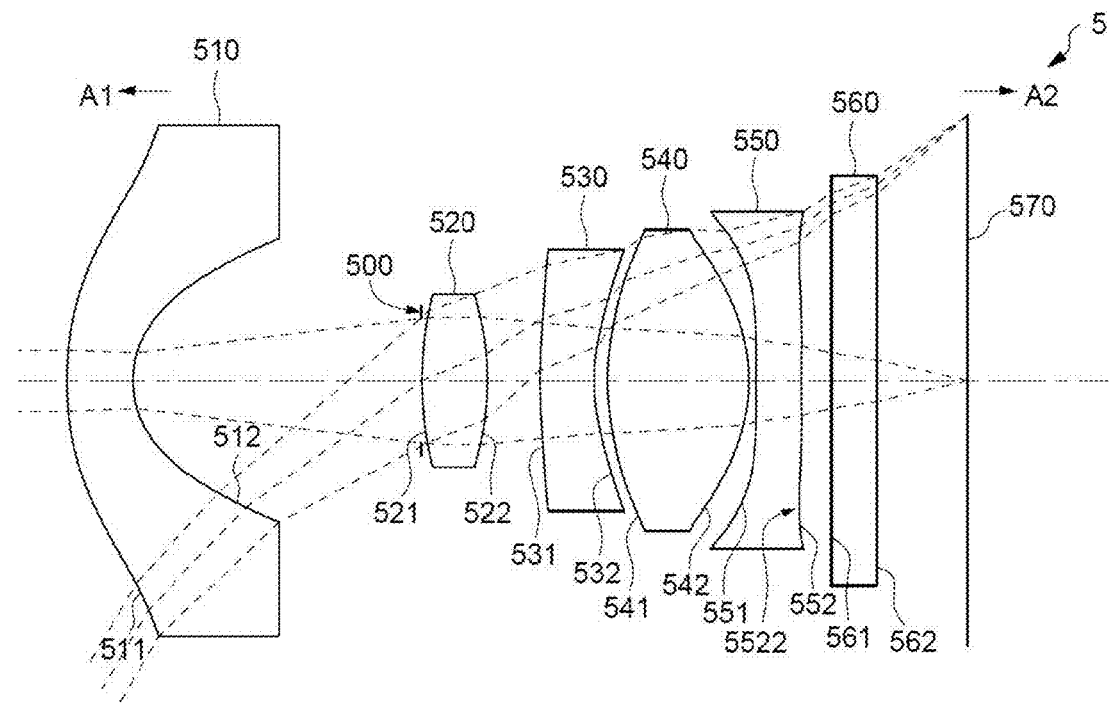
FIG. 22 depicts a cross-sectional view of a fifth embodiment of an optical imaging lens having five lens elements according to the present disclosure.
Figure 23:
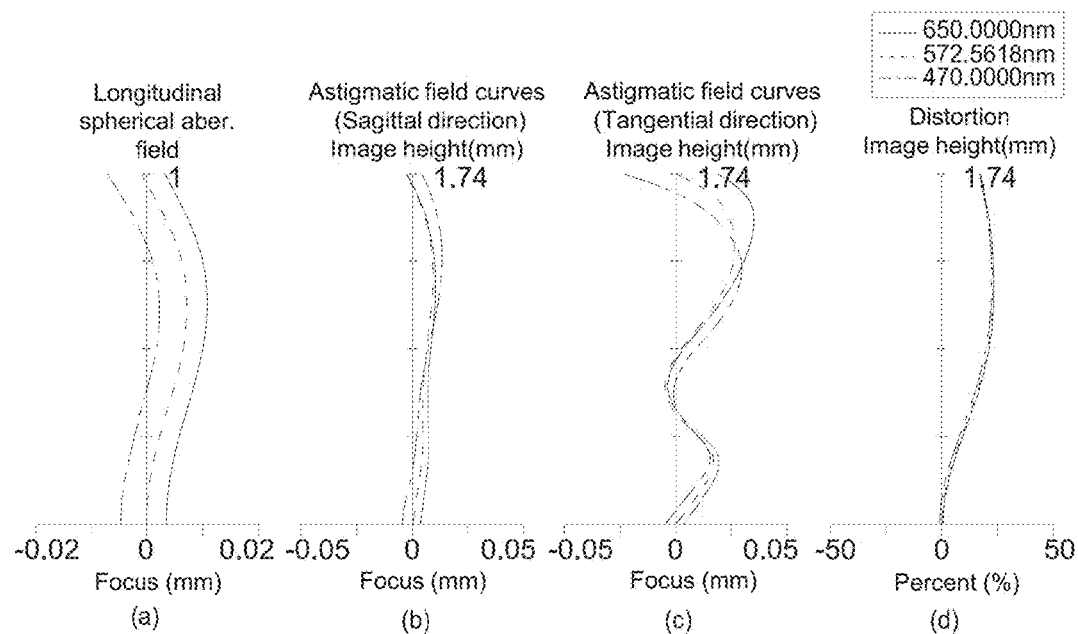
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, an aperture stop 500, a second lens element 520, a third lens element 530, a fourth lens element 540 and a fifth lens element 550.

The differences between the fifth embodiment and the first embodiment may include the radius of curvature and thickness of each lens element, the distance of each air gap, aspherical data, related optical parameters, such as back focal length, the configuration of the concave/convex shape of the image-side surface 552 and the positive refracting power of the fifth lens element 550; but the configuration of the concave/convex shape of surfaces, comprising the object-side surfaces 511, 521, 531, 541, 551 facing to the object side A1 and the image-side surfaces 512, 522, 532, 542 facing to the image side A2, and positive or negative configuration of the refracting power of the first, second, third and fourth lens elements 510, 520, 530, 540 are similar to those in the first embodiment. Specifically, the difference of configuration of surface shape is: the image-side surface 551 of the fifth lens element 550 may comprise a concave portion 5522 in a vicinity of a periphery of the fifth lens element 550. Please refer to FIG. 24 for the optical characteristics of each lens elements in the optical imaging lens 5 of the present embodiment, please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of the present embodiment.

As the longitudinal spherical aberration shown in FIG. 23(*a*), the offset of the off-axis light relative to the image point may be within about ±0.02 mm. As the astigmatism aberration in the sagittal direction shown in FIG. 23(*b*), the focus variation with regard to the three wavelengths in the whole field may fall within about ±0.025 mm. As the astigmatism aberration in the tangential direction shown in FIG. 23(*c*), the focus variation with regard to the three wavelengths in the whole field may fall within about ±0.05 mm. As shown in FIG. 23(*d*), the variation of the distortion aberration may be within about ±25%.

According to the value of the aberrations, it is shown that the optical imaging lens 5 of the present embodiment, with the length as short as about 5.964 mm, the HFOV as large as about 59.299 degrees and the Fno as small as about 2.2, may be capable of providing good imaging quality. Compared with the optical imaging lens 1 of the first embodiment, the length of the optical imaging lens 5 of the present embodiment is shorter and the HFOV is greater.

Figure 26:
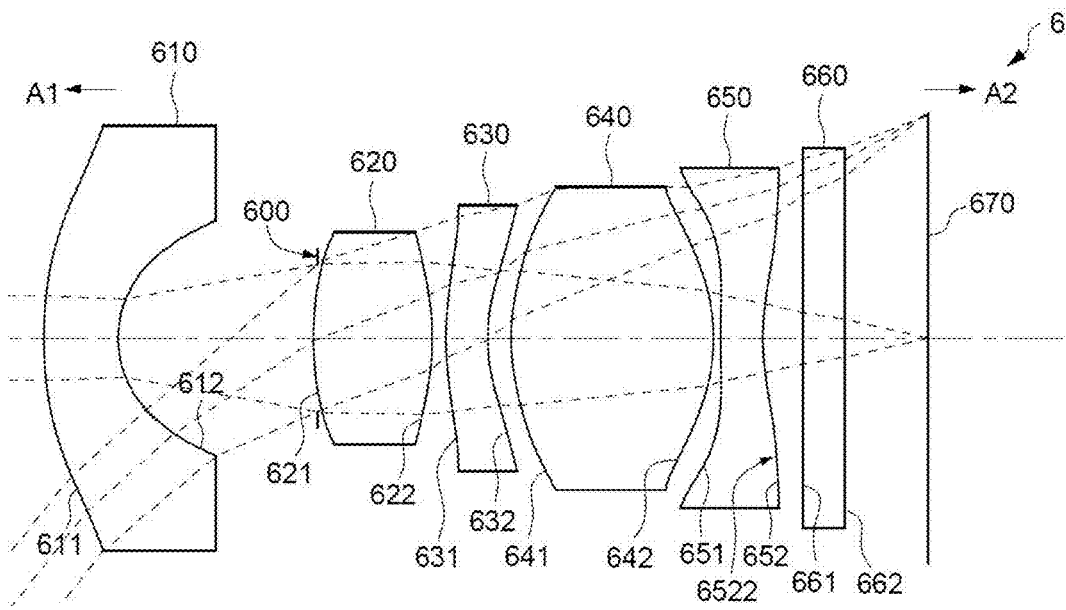
FIG. 26 depicts a cross-sectional view of a sixth embodiment of an optical imaging lens having five lens elements according to the present disclosure.
Figure 27:
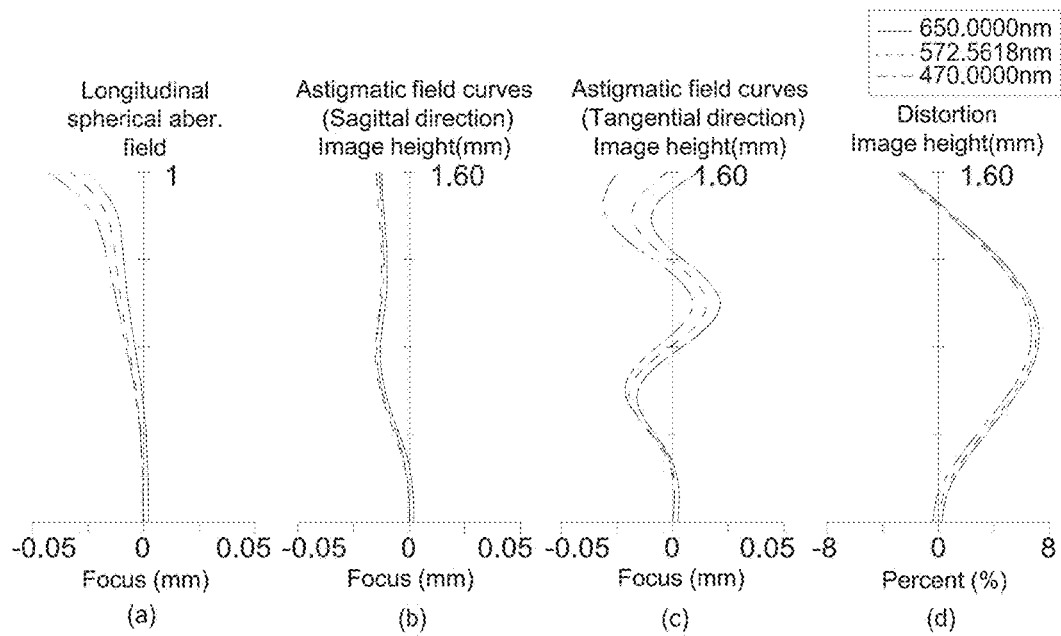
FIG. 27 depicts a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, an aperture stop 600, a second lens element 620, a third lens element 630, a fourth lens element 640 and a fifth lens element 650.

The differences between the sixth embodiment and the first embodiment may include the radius of curvature and thickness of each lens element, the distance of each air gap, aspherical data, related optical parameters, such as back focal length, and the configuration of the concave/convex shape of the image-side surface 652; but the configuration of the concave/convex shape of surfaces, comprising the object-side surfaces 611, 621, 631, 641, 651 facing to the object side A1 and the image-side surfaces 612, 622, 632, 642 facing to the image side A2, and positive or negative configuration of the refracting power of each lens element are similar to those in the first embodiment. Specifically, the difference of configuration of surface shape is: the image-side surface 652 of the fifth lens element 650 may comprise a concave portion 6522 in a vicinity of a periphery of the fifth lens element 650. Please refer to FIG. 28 for the optical characteristics of each lens elements in the optical imaging lens 6 of the present embodiment, please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T+T2+T3+T5)/G12, ALT/(G12+G23+G34), (AAG+BFL)/(T2+T3) and TTL/ALT of the present embodiment.

As the longitudinal spherical aberration shown in FIG. 27(*a*), the offset of the off-axis light relative to the image point may be within about ±0.05 mm. As the astigmatism aberration in the sagittal direction shown in FIG. 27(*b*), the focus variation with regard to the three wavelengths in the whole field may fall within about ±0.025 mm. As the astigmatism aberration in the tangential direction shown in FIG. 27(*c*), the focus variation with regard to the three wavelengths in the whole field may fall within about ±0.05 mm. As shown in FIG. 27(*d*), the variation of the distortion aberration may be within about ±8%. Compared with the first embodiment, the distortion aberration shown in the present embodiment is less.

According to the value of the aberrations, it is shown that the optical imaging lens 6 of the present embodiment, with the length as short as about 6.344 mm, the HFOV as large as about 51.418 degrees and the Fno as small as about 2.2, may be capable of providing better imaging quality.

Figure 30:
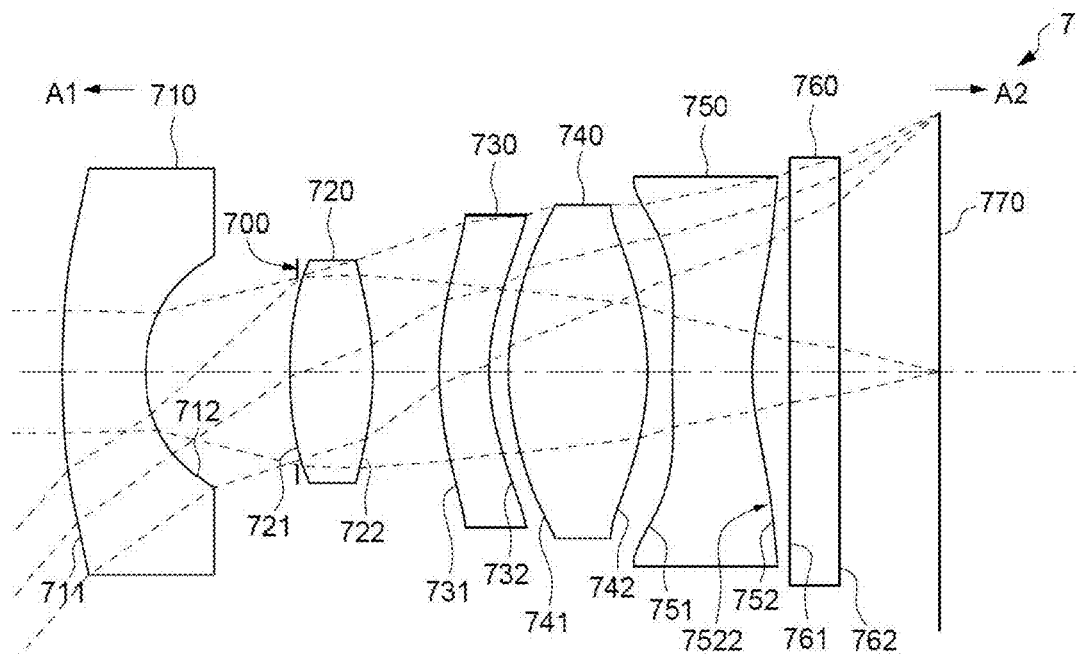
FIG. 30 depicts a cross-sectional view of a seventh embodiment of an optical imaging lens having five lens elements according to the present disclosure.
Figure 31:
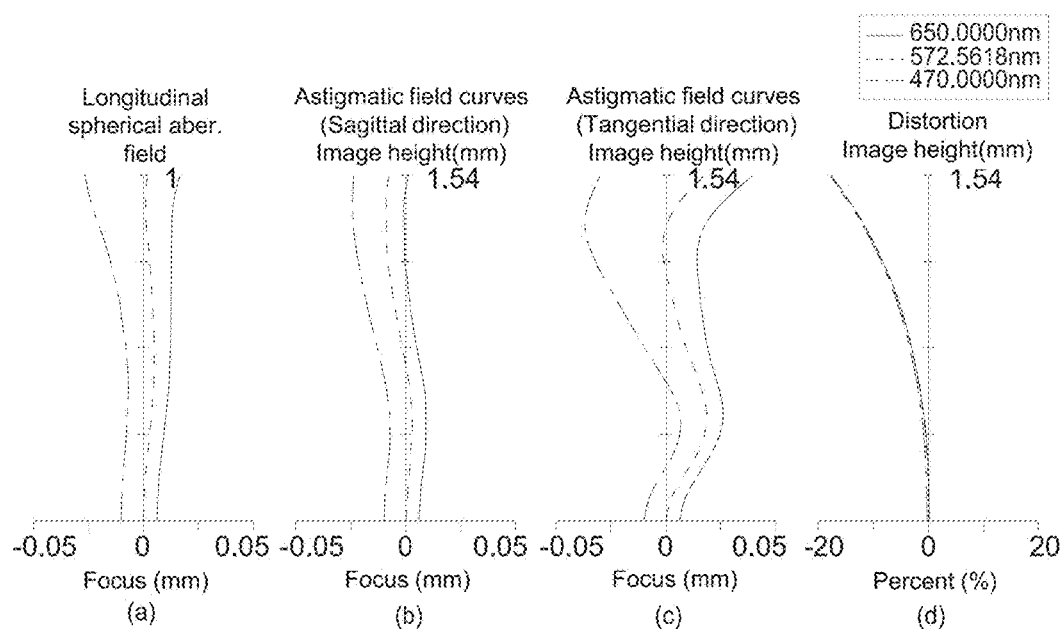
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, an aperture stop 700, a second lens element 720, a third lens element 730, a fourth lens element 740 and a fifth lens element 750.

The differences between the seventh embodiment and the first embodiment may include the radius of curvature and thickness of each lens element, the distance of each air gap, aspherical data, related optical parameters, such as back focal length, and the configuration of the concave/convex shape of the image-side surfaces 752; but the configuration of the concave/convex shape of surfaces, comprising the object-side surfaces 711, 721, 731, 741, 751 facing to the object side A1 and the image-side surfaces 712, 722, 732, 742 facing to the image side A2, and positive or negative configuration of the refracting power of each lens element are similar to those in the first embodiment. Specifically, the differences of configuration of surface shape may include: the image-side surface 752 of the fifth lens element 750 may comprise a concave portion 7522 in a vicinity of a periphery of the fifth lens element 750. Please refer to FIG. 32 for the optical characteristics of each lens elements in the optical imaging lens 7 of the present embodiment, please refer to FIG. 46 for the values of EFL/T5, G12/T1, (T2+G23)/T1, (G12+G45)/T2, ImgH/G12, TTL/(G12+G23+G34), (AAG+ BFL)/T4, TL/ImgH, EFL/BFL, G12/T4, (G34+T4)/T3, (G12+G45)/T4, (T1+T2+T3+T5)/G12, ALT/(G12+G23+ G34), (AAG+BFL)/(T2+T3) and TTL/ALT of the present embodiment.

As the longitudinal spherical aberration shown in FIG. 31(a), the offset of the off-axis light relative to the image point may be within about ±0.05 mm. As the astigmatism aberration in the sagittal direction shown in FIG. 31(b), the focus variation with regard to the three wavelengths in the whole field may fall within about ±0.025 mm. As the astigmatism aberration in the tangential direction shown in FIG. 31(c), the focus variation with regard to the three wavelengths in the whole field may fall within about ±0.05 mm. As shown in FIG. 31(d), the variation of the distortion aberration may be within about ±20%.

According to the value of the aberrations, it is shown that the optical imaging lens 7 of the present embodiment, with the length as short as about 5.291 mm, the HFOV as large as about 49.290 degrees and the Fno as small as about 2.2, may be capable of providing good imaging quality. Compared with the optical imaging lens 1 of the first embodiment, the length of the optical imaging lens 7 of the present embodiment is shorter.

Figure 34:
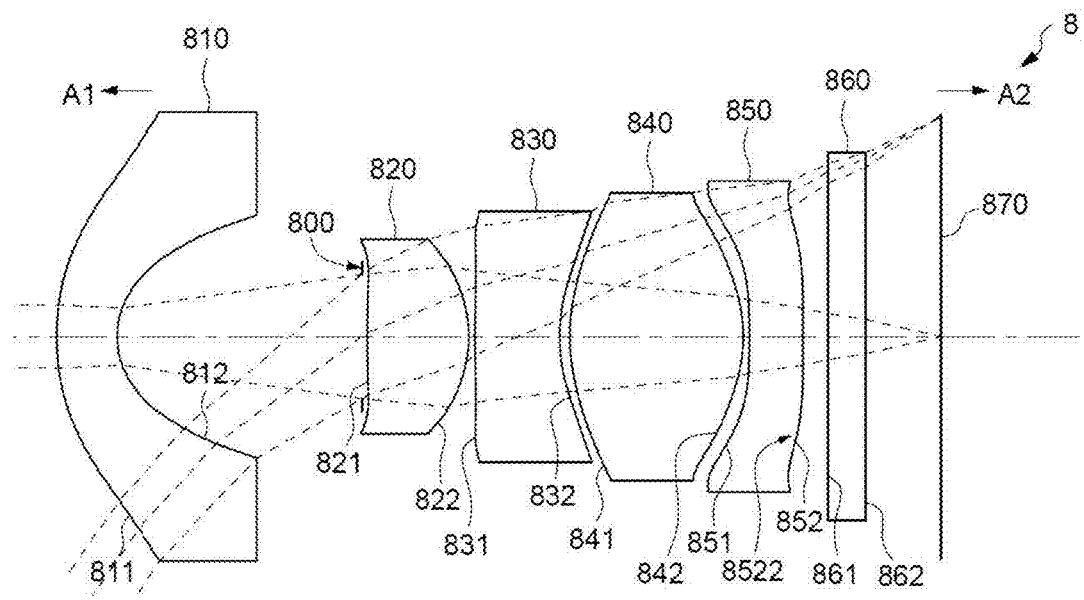
FIG. 34 depicts a cross-sectional view of an eighth embodiment of an optical imaging lens having five lens elements according to the present disclosure.
Figure 35:
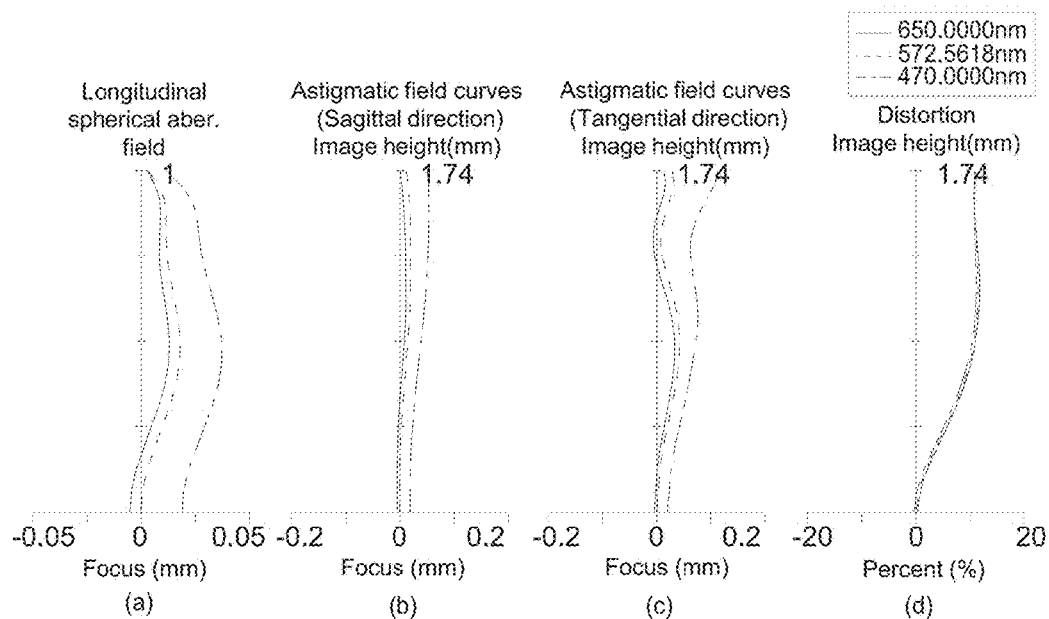
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having five lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, an aperture stop 800, a second lens element 820, a third lens element 830, a fourth lens element 840 and a fifth lens element 850.

The differences between the eighth embodiment and the first embodiment may include the radius of curvature and thickness of each lens element, the distance of each air gap, aspherical data, related optical parameters, such as back focal length, and the configuration of the concave/convex shape of the image-side surface 852; but the configuration of the concave/convex shape of surfaces, comprising the object-side surfaces 811, 821, 831, 841, 851 facing to the object side A1 and the image-side surfaces 812, 822, 832, 842 facing to the image side A2, and positive or negative configuration of the refracting power of each lens element are similar to those in the first embodiment. Specifically, the differences of configuration of surface shape may include: the image-side surface 852 of the fifth lens element 850 may comprise a concave portion 8522 in a vicinity of a periphery of the fifth lens element 850. Please refer to FIG. 36 for the optical characteristics of each lens elements in the optical imaging lens 8 of the present embodiment, please refer to FIG. 46 for the values of EFL/T5, G12/T1, (T2+G23)/T1, (G12+G45)/T2, ImgH/G12, TTL/(G12+G23+G34), (AAG+ BFL)/T4, TL/ImgH, EFL/BFL, G12/T4, (G34+T4)/T3, (G12+G45)/T4, (T1+T2+T3+T5)/G12, ALT/(G12+G23+ G34), (AAG+BFL)/(T2+T3) and TTL/ALT of the present embodiment.

As the longitudinal spherical aberration shown in FIG. 35(a), the offset of the off-axis light relative to the image point may be within about ±0.05 mm. As the astigmatism aberration in the sagittal direction shown in FIG. 35(b), the focus variation with regard to the three wavelengths in the whole field may fall within about ±0.1 mm. As the astigmatism aberration in the tangential direction shown in FIG. 35(c), the focus variation with regard to the three wavelengths in the whole field may fall within about ±0.2 mm. As shown in FIG. 35(d), the variation of the distortion aberration may be within about ±20%.

According to the value of the aberrations, it is shown that the optical imaging lens 8 of the present embodiment, with the length as short as about 7.030 mm, the HFOV as large as about 55 degrees and the Fno as small as about 2.2, may be capable of providing better imaging quality.

Figure 38:
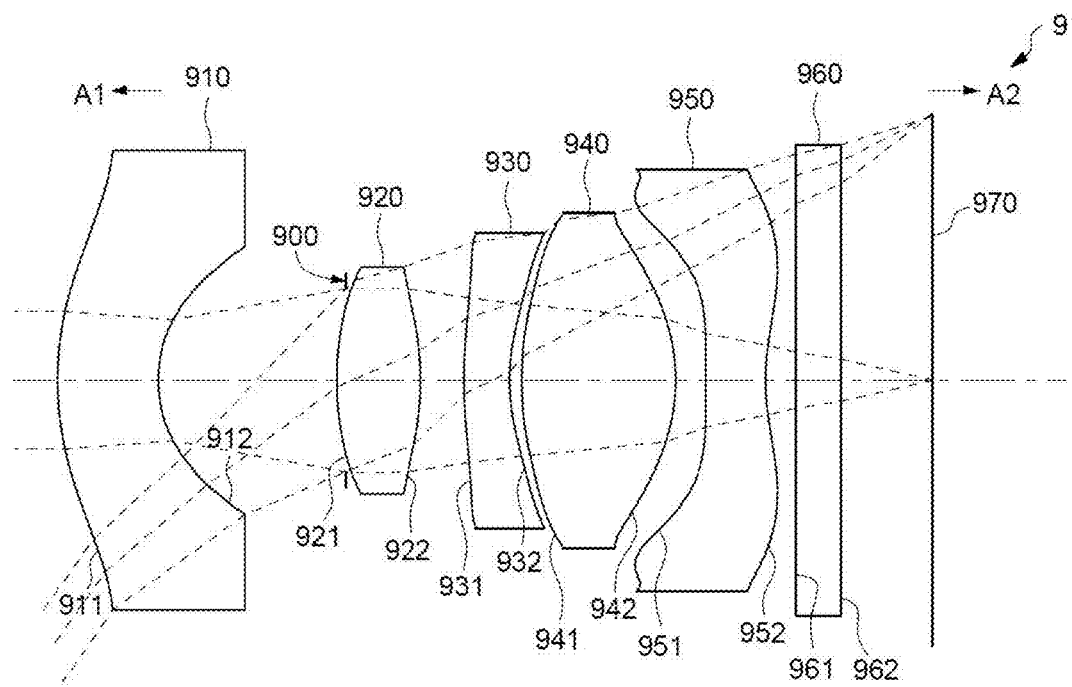
FIG. 38 depicts a cross-sectional view of a ninth embodiment of an optical imaging lens having five lens elements according to the present disclosure.
Figure 39:
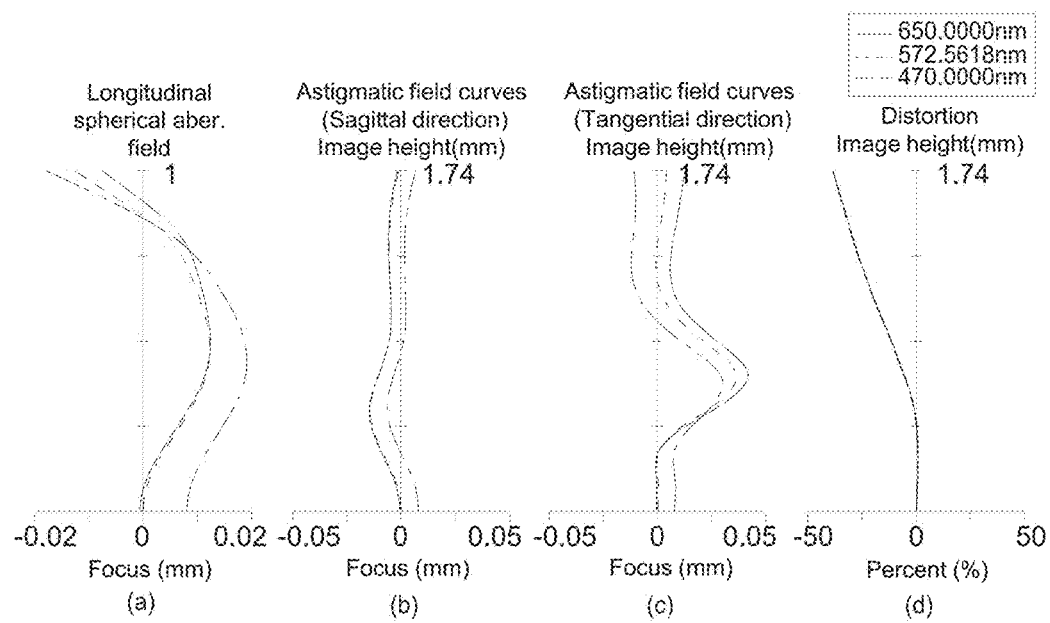
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having five lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, an aperture stop 900, a second lens element 920, a third lens element 930, a fourth lens element 940 and a fifth lens element 950.

The differences between the ninth embodiment and the first embodiment may include the radius of curvature and thickness of each lens element, the distance of each air gap, aspherical data and related optical parameters, such as back focal length; but the configuration of the concave/convex shape of surfaces, comprising the object-side surfaces 911, 921, 931, 941, 951 facing to the object side A1 and the image-side surfaces 912, 922, 932, 942, 952 facing to the image side A2, and positive or negative configuration of the refracting power of each lens element are similar to those in the first embodiment. Please refer to FIG. 40 for the optical characteristics of each lens elements in the optical imaging lens 9 of the present embodiment, please refer to FIG. 46 for the values of EFL/T5, G12/T1, (T2+G23)/T1, (G12+G45)/ T2, ImgH/G12, TTL/(G12+G23+G34), (AAG+BFL)/T4, TL/ImgH, EFL/BFL, G12/T4, (G34+T4)/T3, (G12+G45)/ T4, (T+T2+T3+T5)/G12, ALT/(G12+G23+G34), (AAG+ BFL)/(T2+T3) and TTL/ALT of the present embodiment.

As the longitudinal spherical aberration shown in FIG. 39(a), the offset of the off-axis light relative to the image point may be within about ±0.02 mm. As the astigmatism aberration in the sagittal direction shown in FIG. 39(b), the focus variation with regard to the three wavelengths in the whole field may fall within about ±0.025 mm. As the astigmatism aberration in the tangential direction shown in FIG. 39(c), the focus variation with regard to the three wavelengths in the whole field may fall within about ±0.05 mm. As shown in FIG. 39(d), the variation of the distortion aberration may be within about ±50%.

According to the value of the aberrations, it is shown that the optical imaging lens 9 of the present embodiment, with the length as short as about 5.783 mm, the HFOV as large as about 54.999 degrees and the Fno as small as about 2.2, may be capable of providing good imaging quality. Compared with the optical imaging lens 1 of the first embodiment, the length of the optical imaging lens 9 of the present embodiment is shorter.

Figure 42:
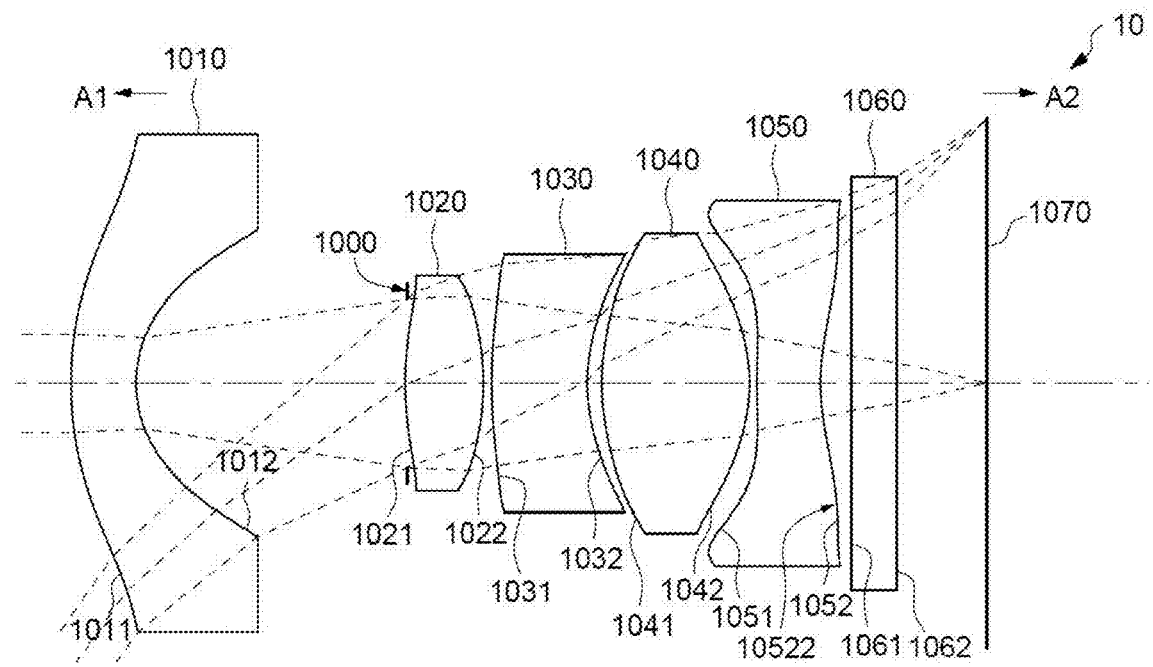
FIG. 42 depicts a cross-sectional view of a tenth embodiment of an optical imaging lens having five lens elements according to the present disclosure.
Figure 43:
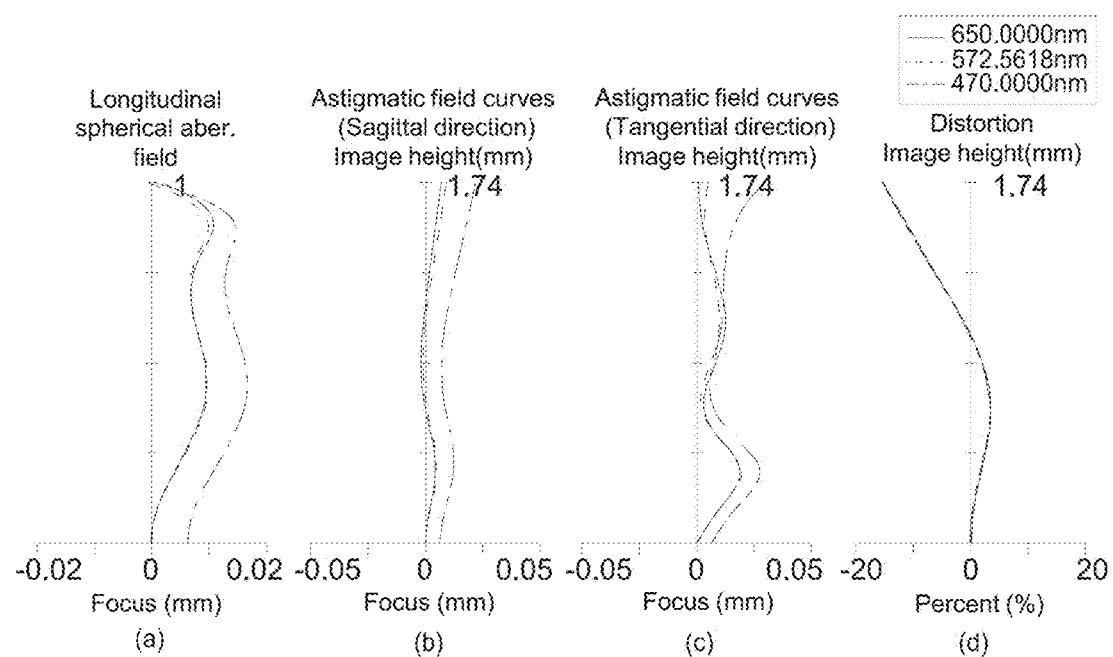
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having five lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, an aperture stop 1000, a second lens element 1020, a third lens element 1030, a fourth lens element 1040 and a fifth lens element 1050.

The differences between the tenth embodiment and the first embodiment may include the radius of curvature and thickness of each lens element, the distance of each air gap, aspherical data, related optical parameters, such as back focal length, and the configuration of the concave/convex shape of the image-side surface 1052; but the configuration of the concave/convex shape of surfaces, comprising the object-side surfaces 1011, 1021, 1031, 1041, 1051 facing to the object side A1 and the image-side surfaces 1012, 1022, 1032, 1042 facing to the image side A2, and positive or negative configuration of the refracting power of each lens element are similar to those in the first embodiment. Specifically, the difference of configuration of surface shape may include: the image-side surface 1052 of the fifth lens element 1050 may comprise a concave portion 10522 in a vicinity of a periphery of the fifth lens element 1050. Please refer to FIG. 44 for the optical characteristics of each lens elements in the optical imaging lens 10 of the present embodiment, please refer to FIG. 46 for the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of the present embodiment.

As the longitudinal spherical aberration shown in FIG. 43(a), the offset of the off-axis light relative to the image point may be within about ±0.02 mm. As the astigmatism aberration in the sagittal direction shown in FIG. 43(b), the focus variation with regard to the three wavelengths in the whole field may fall within about ±0.05 mm. As the astigmatism aberration in the tangential direction shown in FIG. 43(c), the focus variation with regard to the three wavelengths in the whole field may fall within about ±0.05 mm. As shown in FIG. 43(d), the variation of the distortion aberration may be within about ±50%.

According to the value of the aberrations, it is shown that the optical imaging lens 10 of the present embodiment, with the length as short as about 6.092 mm, the HFOV as large as about 55 degrees and the Fno as small as about 2.2, may be capable of providing good imaging quality. Compared with the optical imaging lens 1 of the first embodiment, the length of the optical imaging lens 10 of the present embodiment is shorter.

Please refer to FIG. 46, which show the values of EFL/T5, G12/T1, (T2+G23)/T1, (G12+G45)/T2, ImgH/G12, TTL/(G12+G23+G34), (AAG+BFL)/T4, TL/ImgH, EFL/BFL, G12/T4, (G34+T4)/T3, (G12+G45)/T4, (T1+T2+T3+T5)/G12, ALT/(G12+G23+G34), (AAG+BFL)/(T2+T3) and TTL/ALT of all ten embodiments, and it is clear that the optical imaging lens of the present disclosure satisfy the inequality (1) and/or inequalities (2)~(18). Further, any range which upper and lower limits defined by the values discloses in all of the embodiments shown here may be implemented in the present embodiments.

According to above illustration, the longitudinal spherical aberration, astigmatism aberration both in the sagittal direction and tangential direction and distortion aberration in all embodiments are meet user term of a related product in the market. The off-axis light with regard to six different wavelengths (470 nm, 555 nm, 650 nm, 830 nm, 850 nm, 870 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Further, all of the numerical ranges including the maximum and minimum values and the values therebetween which are obtained from the combining proportion relation of the optical parameters disclosed in each embodiment of the present disclosure are implementable.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element, a second lens element, a third lens element, a fourth lens element, and a fifth lens element sequentially from an object side to an image side along an optical axis, each of the first, second, third, fourth, and fifth lens elements having refracting power, an object-side surface facing toward the object side and allowing an imaging ray to pass therethrough and an image-side surface facing toward the image side and allowing the imaging ray to pass therethrough, wherein:

the first lens element has negative refracting power;
the image-side surface of the second lens element comprises a convex portion in a vicinity of a periphery of the second lens element;
the third lens element has negative refracting power, and the object-side surface of the third lens element comprises a convex portion in a vicinity of a periphery of the third lens element;
the object-side surface of the fourth lens element comprises a convex portion in a vicinity of the optical axis, and the image-side surface of the fourth lens element comprises a convex portion in a vicinity of the optical axis or a periphery of the fourth lens element;
the image-side surface of the fifth lens element comprises a concave portion in a vicinity of the optical axis; and
the optical imaging lens comprises no other lenses having refracting power beyond the five lens elements.

2. The optical imaging lens according to claim 1, wherein an effective focal length of the optical imaging lens is represented by EFL, a thickness of the fifth lens element along the optical axis is represented by T5, wherein EFL and T5 satisfy the inequality:

$EFL/T5 \leq 6.000$.

3. The optical imaging lens according to claim 1, wherein an air gap between the first lens element and the second lens element along the optical axis is represented by G12, a thickness of the first lens element along the optical axis is represented by T1, wherein G12 and T1 satisfy the inequality:

$G12/T1 \leq 4.400$.

4. The optical imaging lens according to claim 1, wherein a thickness of the second lens element along the optical axis is represented by T2, an air gap between the second lens element and the third lens element along the optical axis is represented by G23, a thickness of the first lens element along the optical axis is represented by T1, wherein T2, G23 and T1 satisfy the inequality:

$(T2+G23)/T1 \leq 1.800$.

5. The optical imaging lens according to claim 1, wherein an air gap between the first lens element and the second lens element along the optical axis is represented by G12, an air gap between the fourth lens element and the fifth lens element along the optical axis is represented by G45, a thickness of the second lens element along the optical axis is represented by T2, wherein G12, G45 and T2 satisfy the inequality:

$(G12+G45)/T2 \leq 4.500$.

6. The optical imaging lens according to claim 1, wherein an image height of the optical imaging lens is represented by ImgH, an air gap between the first lens element and the second lens element along the optical axis is represented by G12, wherein ImgH and G12 satisfy the inequality:

$ImgH/G12 \leq 2.000$.

7. The optical imaging lens according to claim 1, wherein a distance between the object-side surface of the first lens element and an image plane along the optical axis is represented by TTL, an air gap between the first lens element and the second lens element along the optical axis is represented by G12, an air gap between the second lens element and the third lens element along the optical axis is represented by G23, an air gap between the third lens element and the fourth lens element along the optical axis is represented by G34, wherein TTL, G12, G23 and G34 satisfy the inequality:

$TTL/(G12+G23+G34) \leq 3.800$.

8. The optical imaging lens according to claim 1, wherein a sum of all four air gaps from the first lens element to the fifth lens element along the optical axis is represented by AAG, a back focal length of the optical imaging lens, which is defined as the distance from the image-side surface of the fifth lens element to an image plane along the optical axis, is represented by BFL, a thickness of the fourth lens element along the optical axis is represented by T4, wherein AAG, BFL and T4 satisfy the inequality:

$(AAG+BFL)/T4 \leq 4.000$.

9. The optical imaging lens according to claim 1, wherein a distance between the object-side surface of the first lens element and the image-side surface of the fifth lens element along the optical axis is represented by TL, an image height of the optical imaging lens is represented by ImgH, wherein TL and ImgH satisfy the inequality:

$TL/ImgH \leq 4.600$.

10. The optical imaging lens according to claim 1, wherein an effective focal length of the optical imaging lens is represented by EFL, a back focal length of the optical imaging lens, which is defined as the distance from the image-side surface of the fifth lens element to an image plane along the optical axis, is represented by BFL, wherein EFL and BFL satisfy the inequality:

$EFL/BFL \leq 2.500$.

11. The optical imaging lens according to claim 1, wherein an air gap between the first lens element and the second lens element along the optical axis is represented by G12, a thickness of the fourth lens element along the optical axis is represented by T4, wherein G12 and T4 satisfy the inequality:

$G12/T4 \leq 2.600$.

12. The optical imaging lens according to claim 1, wherein an air gap between the third lens element and the fourth lens element along the optical axis is represented by G34, a thickness of the fourth lens element along the optical axis is represented by T4, a thickness of the third lens element is represented by T3, wherein G34, T4 and T3 satisfy the inequality:

$(G34+T4)/T3 \leq 5.400$.

13. The optical imaging lens according to claim 1, wherein an air gap between the first lens element and the second lens element along the optical axis is represented by G12, an air gap between the fourth lens element and the fifth lens element along the optical axis is represented by G45, a thickness of the fourth lens element along the optical axis is represented by T4, wherein G12, G45 and T4 satisfy the inequality:

$$(G12+G45)/T4 \leq 2.100.$$

14. The optical imaging lens according to claim 1, wherein a thickness of the first lens element along the optical axis is represented by T1, a thickness of the second lens element along the optical axis is represented by T2, a thickness of the third lens element along the optical axis is represented by T3, a thickness of the fifth lens element along the optical axis is represented by T5, an air gap between the first lens element and the second lens element along the optical axis is represented by G12, wherein T1, T2, T3, T5 and G12 satisfy the inequality:

$$(T1+T2+T3+T5)/G12 \leq 2.600.$$

15. The optical imaging lens according to claim 1, wherein a sum of the thicknesses of all five lens elements along the optical axis is represented by ALT, an air gap between the first lens element and the second lens element along the optical axis is represented by G12, an air gap between the second lens element and the third lens element along the optical axis is represented by G23, an air gap between the third lens element and the fourth lens element along the optical axis is represented by G34, wherein ALT, G12, G23 and G34 satisfy the inequality:

$$ALT/(G12+G23+G34) \leq 2.200.$$

16. The optical imaging lens according to claim 1, wherein a sum of all air gaps from the first lens element to the fifth lens element along the optical axis is represented by AAG, a back focal length of the optical imaging lens, which is defined as the distance from the image-side surface of the fifth lens element to an image plane along the optical axis, is represented by BFL, a thickness of the second lens element along the optical axis is represented by T2, a thickness of the third lens element along the optical axis is represented by T3, wherein AAG, BFL, T2 and T3 satisfy the inequality:

$$(AAG+BFL)/(T2+T3) \leq 4.400.$$

17. The optical imaging lens according to claim 1, wherein a distance between the object-side surface of the first lens element and an image plane along the optical axis is represented by TTL, a sum of the thicknesses of all five lens elements along the optical axis is represented by ALT, wherein TTL and ALT satisfy the inequality:

$$TTL/ALT \leq 2.700.$$

18. The optical imaging lens according to claim 1, wherein an abbe number of the second lens element is represented by V2, an abbe number of the third lens element is represented by V3, an abbe number of the fifth lens element is represented by V5, wherein V2, V3 and V5 satisfy the inequality:

$$V2 > (V3+V5).$$

19. The optical imaging lens according to claim 1, wherein an abbe number of the fourth lens element is represented by V4, an abbe number of the third lens element is represented by V3, an abbe number of the fifth lens element is represented by V5, wherein V4, V3 and V5 satisfy the inequality:

$$V4 > (V3+V5).$$

* * * * *

UNITED STATES PATENT AND TRADEMARK OFFICE
CERTIFICATE OF CORRECTION

PATENT NO. : 10,429,620 B2
APPLICATION NO. : 15/791889
DATED : October 1, 2019
INVENTOR(S) : Sheng-Wei Hsu and Pei-Chi Wang Page 1 of 1

It is certified that error appears in the above-identified patent and that said Letters Patent is hereby corrected as shown below:

On the Title Page

Please change the name of the Assignee (73) from "GENIUS ELECTRONIC OPTICAL (XIAMEN) CO., LTD." to "GENIUS ELECTRONIC OPTICAL CO., LTD."

Signed and Sealed this
Fifteenth Day of September, 2020

Andrei Iancu
*Director of the United States Patent and Trademark Office*